US010454755B2

(12) United States Patent
John Wilson et al.

(10) Patent No.: US 10,454,755 B2
(45) Date of Patent: Oct. 22, 2019

(54) BEAM FAILURE IDENTIFICATION AND RECOVERY TECHNIQUES

(71) Applicant: QUALCOMM Incorporated, San Diego, CA (US)

(72) Inventors: Makesh Pravin John Wilson, San Diego, CA (US); Tao Luo, San Diego, CA (US); Sony Akkarakaran, Poway, CA (US); Xiao feng Wang, San Diego, CA (US); Sumeeth Nagaraja, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/887,656

(22) Filed: Feb. 2, 2018

(65) Prior Publication Data
US 2018/0278467 A1 Sep. 27, 2018

Related U.S. Application Data

(60) Provisional application No. 62/475,217, filed on Mar. 22, 2017.

(51) Int. Cl.
*H04L 12/24* (2006.01)
*H04W 72/04* (2009.01)
(Continued)

(52) U.S. Cl.
CPC .......... *H04L 41/0654* (2013.01); *H04B 7/00* (2013.01); *H04B 7/0695* (2013.01);
(Continued)

(58) Field of Classification Search
CPC .......... H04L 41/0654; H04L 41/0677; H04W 72/046; H04W 24/10; H04W 72/0413;
(Continued)

(56) References Cited

U.S. PATENT DOCUMENTS

2010/0322097 A1* 12/2010 Jen .................. H04L 1/1854
370/252
2015/0180625 A1* 6/2015 Park .................. H04W 72/04
370/329
(Continued)

FOREIGN PATENT DOCUMENTS

WO WO2017024516 A1 2/2017
WO WO2017151876 A1 9/2017

*Primary Examiner* — Brandon J Miller
(74) *Attorney, Agent, or Firm* — Holland & Hart LLP

(57) ABSTRACT

Methods, systems, and devices for wireless communication are described that support beam failure identification and recovery is systems that may use beamforming for uplink and downlink transmission beams. A first beam and a second beam may be configured, and the second beam may be used to identify a failure of the first beam. Upon detection of a beam failure, a beam recovery procedure may be initiated in which an indication of a beam failure may be transmitted using scheduling request (SR) or uplink control channel resource. A base station in some examples may transmit an indication that one of a set of beams may have failed, and a UE may provide an indication of which beam of the set of beams failed, such as based on a received reference signal associated with one of the beams.

30 Claims, 19 Drawing Sheets

(51) Int. Cl.
  *H04B 7/00*   (2006.01)
  *H04B 7/06*   (2006.01)
  *H04W 88/02*  (2009.01)
  *H04W 24/10*  (2009.01)
  *H04W 88/08*  (2009.01)

(52) U.S. Cl.
  CPC ....... *H04L 41/0677* (2013.01); *H04W 72/046* (2013.01); *H04W 72/0413* (2013.01); *H04W 24/10* (2013.01); *H04W 88/02* (2013.01); *H04W 88/08* (2013.01)

(58) Field of Classification Search
  CPC ..... H04W 88/08; H04W 88/02; H04W 24/02; H04W 72/044; H04B 7/00; H04B 7/0695
  See application file for complete search history.

(56) References Cited

U.S. PATENT DOCUMENTS

| | | | |
|---|---|---|---|
| 2015/0222402 A1* | 8/2015 | Ouchi | H04L 1/00 370/329 |
| 2016/0183233 A1 | 6/2016 | Park et al. | |
| 2016/0183275 A1* | 6/2016 | Inoue | H04B 7/0695 455/450 |
| 2016/0192433 A1* | 6/2016 | Deenoo | H04W 72/046 370/329 |
| 2016/0353510 A1* | 12/2016 | Zhang | H04L 43/16 |
| 2017/0207843 A1 | 7/2017 | Jung et al. | |
| 2018/0006770 A1* | 1/2018 | Guo | H04L 1/1835 |

\* cited by examiner

BEAM FAILURE IDENTIFICATION AND RECOVERY TECHNIQUES

CROSS REFERENCES

The present Application for Patent claims priority to U.S. Provisional Patent Application No. 62/475,217 by John Wilson, et al., entitled "BEAM FAILURE IDENTIFICATION AND RECOVERY TECHNIQUES," filed Mar. 22, 2017, assigned to the assignee hereof.

BACKGROUND

The following relates generally to wireless communication, and more specifically to beam failure identification and recovery techniques.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

Some wireless communications systems (e.g., NR systems) may operate in frequency ranges that are associated with beamformed transmissions between wireless devices. For example, transmissions in millimeter wave (mmW) frequency ranges and may be associated with increased signal attenuation (e.g., path loss) as compared to transmissions in non-mmW frequency ranges. As a result, signal processing techniques such as beamforming may be used to combine energy coherently and overcome the path losses in these systems. In some cases, one or more active beams between two wireless devices may become misaligned. Upon detecting such a misalignment, a UE may attempt to access uplink resources to reconnect with the serving cell, but certain resources used to convey the attempt to access resources may be associated with limited throughput and high latency. In some cases, a physical uplink control channel (PUCCH) transmit beam may not be derived from a physical downlink control channel (PDCCH) receive beam, and thus, it may become difficult to identify which of the PUCCH or PDCCH control beams may have failed. Thus, improved techniques for uplink resource allocation for beam recovery and beam failure identification may be desired.

SUMMARY

The described techniques relate to improved methods, systems, devices, or apparatuses that support beam failure identification and recovery. Generally, the described techniques provide for configuration of a first beam and a second beam, and the second beam may be used to identify a failure of the first beam. Upon detection of a beam failure, a beam recovery procedure may be initiated in which an indication of a beam failure may be transmitted using scheduling request (SR) or uplink control channel resource. In some cases, a base station may transmit an indication that one of a set of beams may have failed, and the UE may provide an indication of which beam of the set of beams failed, such as based on a received reference signal associated with one of the beams.

In some cases, the first beam may be an uplink beam from a UE to a base station, and a beam failure may be identified by the UE by monitoring a downlink reference signal or a synchronization signal antenna port set that is associated with antenna ports used to transmit the uplink beam. The associated antenna ports may be, for example, quasi-co-located (QCL) with antenna ports used to transmit the first beam. A failure in the uplink beam from the UE may also be identified at the base station, such as by configuring sounding reference signal (SRS) ports that are QCL with antenna ports used to transmit the uplink beam, and monitoring the SRS ports to identify an uplink beam failure.

In some cases, the first beam may be a downlink beam from the base station to the UE, and a beam failure may be identified by the UE by monitoring a set of ports configured for reference signal or synchronization signal transmissions from the base station, which may be QCL with antenna ports of the downlink beam. In some cases, a failure of the downlink beam may be identified at the base station by configuring the UE to transmit an SRS that is derived from the downlink beam and monitoring the SRS. For example, the SRS may be derived from the downlink beam used to receive the downlink transmission (e.g., PDCCH) or SS/CSI-RS port sets.

In some cases, both the first beam and the second beam may be downlink beams from the base station to the UE. Antenna ports for transmitting the second beam may be configured for downlink reference signal or downlink synchronization signal transmissions and quasi-co-located (QCL) with antenna ports for transmitting the first beam. A beam failure of the first beam may be determined based at least in part on received downlink reference signal or the downlink synchronization signal transmissions. A beam recovery procedure for the first beam may be based at least in part on the determination of the beam failure.

In some cases, both the first beam and the second beam may be uplink beams. Antenna ports for transmitting the second beam may be configured for uplink reference signal transmissions and QCL with antenna ports for transmitting the first beam. A beam failure of the first beam may be determined based at least in part on the uplink reference signal transmissions. A beam recovery procedure may be triggered for the first beam based at least in part on the determination of the beam failure.

A method for wireless communication is described. The method may include identifying a first set of antenna ports for a first transmission beam and a second set of antenna ports for a second transmission beam, the second set of antenna ports being different than the first set of antenna ports, measuring one or more signal characteristics of the second transmission beam, and triggering a beam recovery procedure for the first transmission beam based at least in part on the one or more measured signal characteristics of the second transmission beam, the first transmission beam being an uplink transmission beam from a user equipment (UE) to a base station and the second transmission beam being a downlink transmission beam from the base station to the UE.

Another method for wireless communication is described. The method may include identifying a first set of antenna ports for a first transmission beam and a second set of antenna ports for a second transmission beam, the second set of antenna ports being different than the first set of antenna ports, measuring one or more signal characteristics of the second transmission beam, and triggering a beam recovery procedure for the first transmission beam based at least in part on the one or more measured signal characteristics of the second transmission beam, the identifying the first set of antenna ports and the second set of antenna ports including configuring the first set of antenna ports for transmissions of a downlink transmission beam, and configuring the second set of antenna ports for transmission of an uplink transmission beam as the second transmission beam, the uplink transmission beam including a reference signal that is derived from the first transmission beam.

Another method for wireless communication is described. The method may include identifying a first set of antenna ports for a first transmission beam and a second set of antenna ports for a second transmission beam, the second set of antenna ports being different than the first set of antenna ports, measuring one or more signal characteristics of the second transmission beam, and triggering a beam recovery procedure for the first transmission beam based at least in part on the one or more measured signal characteristics of the second transmission beam, the identifying the first set of antenna ports and the second set of antenna ports including configuring the first set of antenna ports for transmissions of a downlink transmission beam as the first transmission beam, and configuring the second set of antenna ports for transmissions of a downlink transmission beam as the second transmission beam, the second set of antenna ports being quasi-co-located with the first set of antenna ports.

An apparatus for wireless communication is described. The apparatus may include a processor, memory in electronic communication with the processor, and instructions stored in the memory. The instructions may be operable to cause the processor to identify a first set of antenna ports for the first transmission beam and a second set of antenna ports for second transmission beam, the second set of antenna ports being different than the first set of antenna ports, measure one or more signal characteristics of the second transmission beam, and trigger a beam recovery procedure for the first transmission beam based at least in part on the one or more measured signal characteristics of the second transmission beam, the first transmission beam being an uplink transmission beam from a user equipment (UE) to a base station and the second transmission beam being a downlink transmission beam from the base station to the UE.

In some examples of the methods and apparatus described above, the triggering the beam recovery procedure includes transmitting an indication of a beam failure using a configured transmission resource. In some examples of the methods and apparatus described above, the indication of the beam failure includes an indication of one or more of a transmission beam failure or a reception beam failure. In some examples of the methods and apparatus described above, the configured transmission resource includes one or more of a scheduling request (SR) resource or a physical uplink control channel (PUCCH) resource that may be configured for transmitting the indication of the beam failure.

In some examples of the methods and apparatus described above, the triggering the beam recovery procedure includes transmitting an indication that one or more of the uplink transmission beam or the downlink transmission beam were unsuccessfully received. Some examples of the methods and apparatus described above may further include processes, features, or instructions for receiving a signal indicating which of the uplink transmission beam or the downlink transmission beam was unsuccessfully received.

Some examples of the methods and apparatus described above may further include processes, features, or instructions for receiving a signal indicating that the first transmission beam or the second transmission beam was unsuccessfully received. Some examples of the methods and apparatus described above may further include processes, features, or instructions for determining, based at least in part on the measuring one or more signal characteristics, which of the first transmission beam or the second transmission was unsuccessfully received. In some examples of the methods and apparatus described above, the triggering the recovery procedure includes transmitting an indication of which of the first transmission beam or the second transmission was unsuccessfully received.

In some examples of the methods and apparatus described above, the identifying the first set of antenna ports and the second set of antenna ports includes receiving a configuration to use the first set of antenna ports for the first transmission beam and to use the second set of antenna ports for measuring one or more of a reference signal (RS) or synchronization signal (SS) provided over the second transmission beam.

In some examples of the methods and apparatus described above, the measuring the one or more signal characteristics of the second transmission beam includes measuring one or more of the RS or SS received on the second set of ports to obtain a channel quality value and comparing the channel quality value to a threshold value associated with a failure of the first transmission beam.

In some examples of the methods and apparatus described above, the triggering the beam recovery procedure includes transmitting an indication of a first transmission beam failure responsive to the channel quality or strength (e.g., reference signal received power, reference signal-signal to interference plus noise ratio, reference signal received quality, etc.) value being below the threshold value.

Some examples of the methods and apparatus described above may further include processes, features, or instructions for transmitting the first transmission beam using the first set of antenna ports. Some examples of the methods and apparatus described above may further include processes, features, or instructions for receiving the second transmission beam using the second set of antenna ports. Some examples of the methods and apparatus described above may further include processes, features, or instructions for measuring the reference signal included in the second transmission beam. Some examples of the methods and apparatus described above may further include processes, features, or instructions for determining a beam failure of the first transmission beam based at least in part on the measured reference signal. Some examples of the methods and apparatus described above may further include processes, features, or instruction that the triggering the beam recovery procedure for the first transmission beam may be based at least in part on the determining the beam failure.

Some examples of the methods and apparatus described above may further include processes, features, or instructions for receiving the first transmission beam using the first set of antenna ports. Some examples of the methods and apparatus described above may further include processes, features, or instructions for deriving the reference signal from the received first transmission beam. Some examples of the methods and apparatus described above may further include processes, features, or instructions for transmitting the reference signal in the second transmission beam.

Some examples of the methods and apparatus described above may further include processes, features, or instructions for receiving the downlink reference signal transmissions. Some examples of the methods and apparatus described above may further include processes, features, or instructions for determining a beam failure of the first transmission beam based at least in part on the received downlink reference signal transmissions, and wherein the triggering the beam recovery procedure for the first transmission beam may be based at least in part on the determining the beam failure.

DETAILED DESCRIPTION

Figure 1:
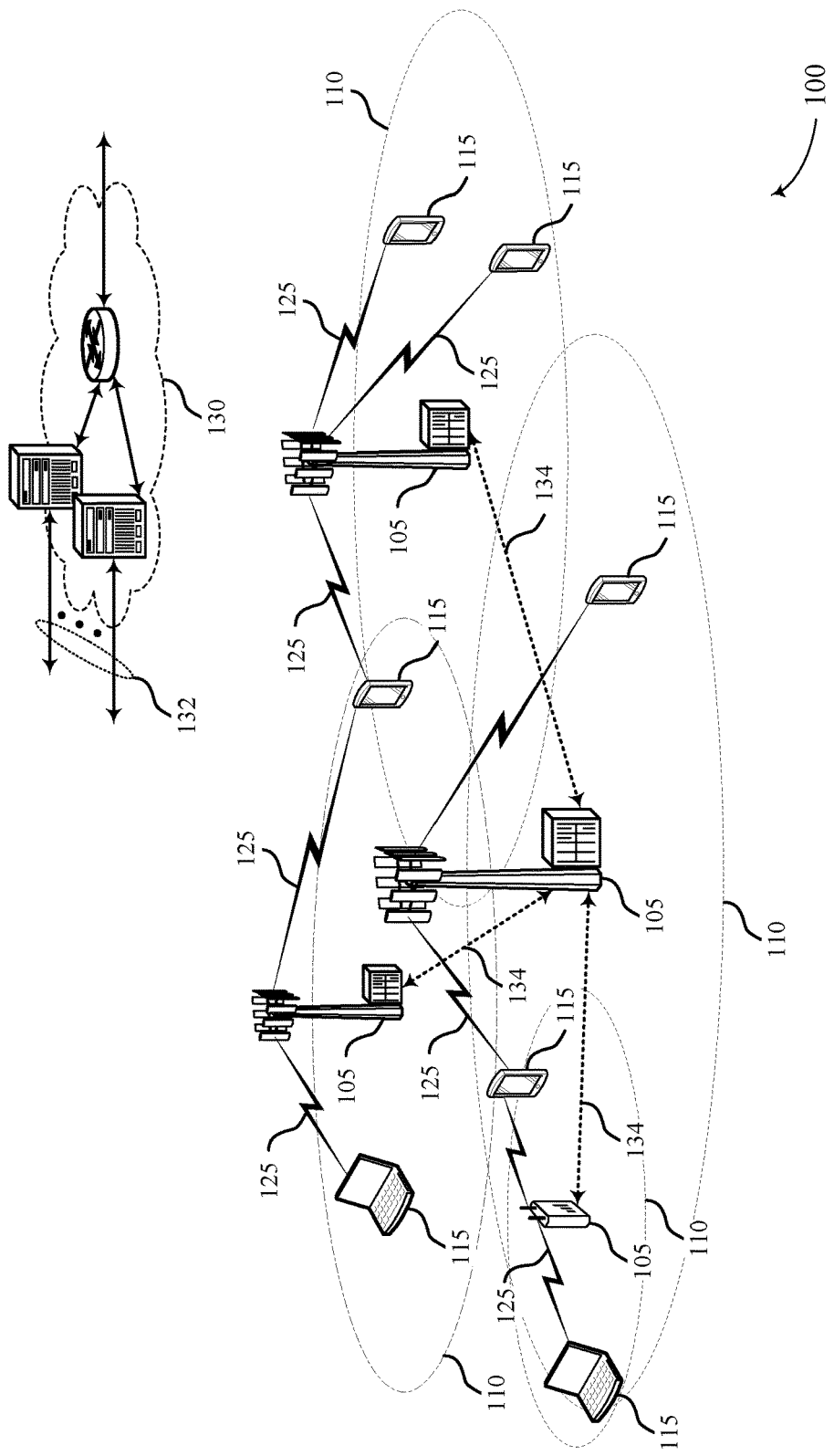
FIG. 1 illustrates an example of a system for wireless communication that supports beam failure identification and recovery techniques in accordance with aspects of the present disclosure.

Some wireless communication systems may operate in frequency ranges that support beamformed transmissions between wireless devices. For example, communications in mmW frequency bands may experience increased signal attenuation (e.g., path loss). As a result, signal processing techniques such as beamforming may be used to combine energy coherently and overcome the path losses in these systems. In such systems, wireless devices, such as a UE and a base station, may be able to communicate over one or more active beams, which may correspond to a transmit beam used at a transmitting device and a receive beam at a receiving device (e.g., a beam pair). In some cases, an active beam pair(s) may become misaligned (e.g., due to a beam switch failure or a signal blockage) such that the UE and the base station may not be able to communicate over the obstructed active beam pair(s) due to the beam failure. A UE may accordingly detect a beam failure (e.g., by monitoring a subset of reference signals) on the active beams used to communicate with the base station.

In some cases, a base station may configure a first beam and a second beam, and the second beam may be used to identify a failure of the first beam. Upon detection of a beam failure, a beam recovery procedure may be initiated in which an indication of a beam failure may be transmitted using, for example, a SR or physical uplink control channel (PUCCH) resource. In some cases, a base station may transmit an indication that one of a set of beams may have failed, and the UE may provide an indication of which beam of the set of beams has failed, such as based on a received reference signal associated with one of the beams.

In some cases, the first beam may be an uplink beam from a UE to a base station, and the base station may configure the UE to use a transmit beam for PUCCH based on a receive beam at the UE, which corresponds to a downlink CSI-RS/SS port set. The base station may configure the UE to monitor the downlink CSI-RS/SS ports and indicate a beam failure based on CSI-RS/SS measurements. The UE may then trigger a beam recovery procedure based on the CSI-RS/SS measurements.

In some cases, a failure in the uplink beam from a UE may be identified at the base station. In such examples, the base station may configure the UE to transmit an SRS over ports which are QCL with the PUCCH transmit beam ports. The base station may then measure the SRS ports and, from an energy associated with the SRS ports, identify a beam failure. The base station may then trigger a PUCCH beam recovery procedure based on the SRS measurements.

In some cases, the first beam may be a downlink beam from the base station to the UE, and a beam failure may be identified by the UE. In some cases, the base station may indicate to the UE that it transmits PDCCH using ports that are QCL with a downlink CSI-RS/SS port set. The UE can measure the CSI-RS/SS port set associated with PDCCH and identify a beam failure via the measurements. In some cases, measurements may be compared against a threshold value and a beam failure determined based on the comparison. A threshold value may include an energy level threshold, a reference signal received power (RSRP) threshold, a reference signal received quality (RSRQ) threshold, a reference signal-signal to interference plus noise ratio (RS-SINR), a PDCCH block error rate (BLER) threshold, or the like. For example, a beam failure may be determined if a measured energy associated with the CSI-RS port set is below an energy threshold (e.g., 0 decibel or 5 decibel). A beam failure may occur if the PDCCH BLER exceeds a radio link monitoring default BLER threshold or a BLER threshold determined based on, e.g., a specific aggregation level, a DCI format, or the like.

In some cases, a failure of the downlink beam may be identified at the base station. In such cases, the base station may configure the UE to transmit a sounding reference signal (SRS) that is derived from the downlink beam using a set of antenna ports for the SRS. In such cases, the UE may derive the uplink beam from the downlink beam used to receive the downlink transmission (e.g., PDCCH) or SS/CSI-RS port sets, such as according to established beamforming techniques. The base station may measure the SRS antenna ports and identify a beam failure based on the SRS measurements. The base station then may trigger a PDCCH beam recovery procedure based on the SRS measurements.

Aspects of the disclosure are initially described in the context of a wireless communications system. Aspects of the disclosure are further illustrated by and described with reference to apparatus diagrams, system diagrams, and flowcharts that relate to beam failure identification and recovery techniques.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE), LTE-Advanced (LTE-A) network, or a New Radio (NR) network. In some cases, wireless communications system 100 may support enhanced broadband communications, ultra-reliable (i.e., mission critical) communications, low latency communications, and communications with low-cost and low-complexity devices. Wireless communications system 100 may support beam failure identification and recovery techniques.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

The core network 130 may provide user authentication, access authorization, tracking, Internet Protocol (IP) connectivity, and other access, routing, or mobility functions. At least some of the network devices, such as a base station 105 may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate in an ultra-high frequency (UHF) frequency region using frequency bands from 700 MHz to 2600 MHz (2.6 GHz), although in some cases wireless local area networks (WLANs) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Wireless communications system 100 may thus support mmW communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g. a base station 105) to shape and/or steer an overall antenna beam in the direction of a target receiver (e.g. a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g. a base station 105) and a receiver (e.g. a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays (e.g., panels), which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may use multiple antennas or antenna arrays to conduct beamforming operations for directional communications with a UE 115.

In some cases, wireless communications system 100 may be a packet-based network that operate according to a layered protocol stack. In the user plane, communications at the bearer or Packet Data Convergence Protocol (PDCP) layer may be IP-based. A radio link control (RLC) layer may in some cases perform packet segmentation and reassembly to communicate over logical channels. A medium access control (MAC) layer may perform priority handling and multiplexing of logical channels into transport channels. The MAC layer may also use hybrid automatic repeat request (HARD) to provide retransmission at the MAC layer to improve link efficiency. In the control plane, the RRC protocol layer may provide establishment, configuration, and maintenance of an RRC connection between a UE 115 and a network device, or core network 130 supporting radio bearers for user plane data. At the physical (PHY) layer, transport channels may be mapped to physical channels.

Thus, in wireless communications system 100, UEs 115 and base stations 105, communicate over one or more active beams, which may correspond to a transmit beam used at the transmitting device and a receive beam used at a receiving device (e.g., a beam pair). In some cases, the active beam pair(s) may become misaligned (e.g., due to beam switch failure or signal blockage) such that the UE and base station may not be able to communicate over the obstructed active beam pair(s) due to the beam failure. Furthermore, downlink beams and uplink beams may utilize different beams, in which the uplink beam may not be derived from the downlink beam. Various techniques as discussed herein provide for the identification that a certain beam has failed, and beam recovery. In some cases, a UE 115 may detect a failure in a downlink beam or an uplink beam, and initiate a beam recovery. In other cases, a base station 105 may detect a failure in a downlink beam or an uplink beam, and initiate a beam recovery.

Figure 2:
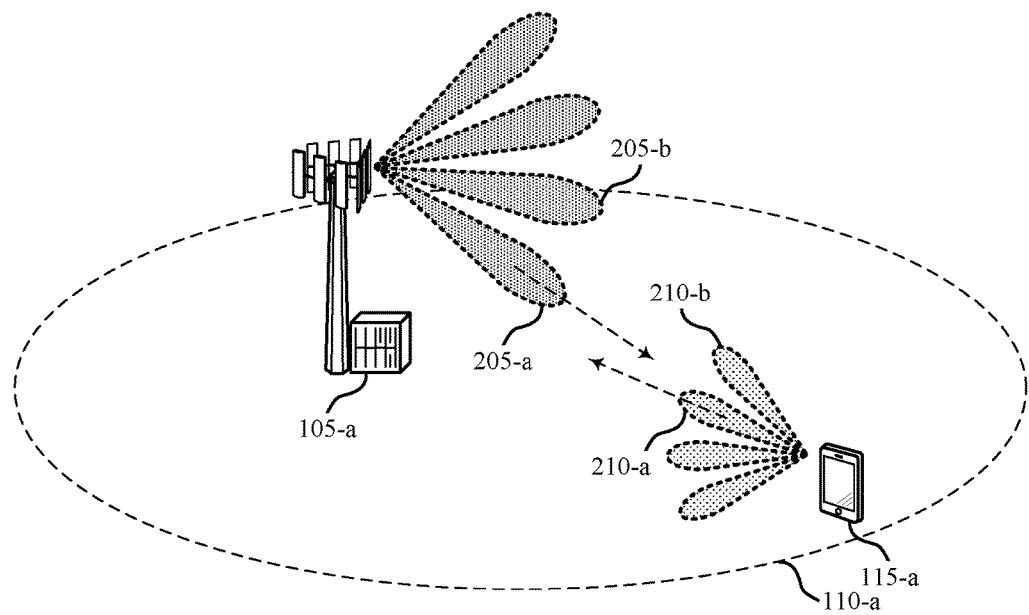
FIG. 2 illustrates an example of a wireless communications system that supports beam failure identification and recovery techniques in accordance with aspects of the present disclosure.

FIG. 2 illustrates an example of wireless communications system 200 that supports beam failure identification and recovery techniques in accordance with various aspects of the present disclosure. Wireless communications system 200 includes a base station 105-a and a UE 115-a, each of which may be an example of the corresponding devices as described with reference to FIG. 1.

Wireless communications system 200 may operate in frequency ranges that are associated with beamformed transmissions between base station 105-a and UE 115-a. For example, wireless communications system 200 may operate using mmW frequency ranges. As a result, signal processing techniques, such as beamforming may be used to combine energy coherently and overcome path losses. By way of example, base station 105-a may contain multiple antennas. In some cases, each antenna may transmit (or receive) a phase-shifted version of a signal such that the phase-shifted versions constructively interfere in certain regions and destructively interfere in others. Weights may be applied to the various phase-shifted versions, e.g., in order to steer the transmissions in a desired direction. Such techniques (or similar techniques) may serve to increase the coverage area 110-a of the base station 105-a or otherwise benefit wireless communications system 200.

Downlink beams 205-a and 205-b represent examples of beams over which data (e.g., or control information) may be transmitted. Accordingly, each downlink beam 205 may be directed from base station 105-a toward a different region of the coverage area 110-a and in some cases, two or more beams may overlap. Downlink beams 205-a and 205-b may be transmitted simultaneously or at different times. In either case, a UE 115-a may be capable of receiving the information in one or more downlink beams 205. Similarly, UE 115-a may transmit two or more uplink beams 210 (e.g., uplink beams 210-a, 210-b).

In one example, UE 115-a may be configured to receive a downlink transmission on downlink beam 205-a, and to transmit an uplink transmission on uplink beam 210-a. In this case, uplink beam 210-a may not be derived from the downlink beam 205-a. Thus, in some cases, one of the uplink beam 210-a and the downlink beam 205-a may be successfully received, and the other may fail. Thus, failure of one of the beams may not be readily apparent because the corresponding other beam of the beam pair is successfully received. Various techniques provided herein provide for beam failure identification and recovery.

In some cases, base station 105-a may configure a uplink beam 210-a to be transmitted using a first set of antenna ports (uplink beam 210-a may be derived from the downlink beam 205-a), and the base station 105-a may configure the UE 115-a with a downlink CSI-RS/SS port set. The base station 105-a may configure the UE to monitor the downlink CSI-RS/SS ports transmitted with downlink beam 205-a and indicate a beam failure based on CSI-RS/SS measurements. In some cases, a threshold value may be used to determine a beam failure, and the UE 115-a may compare CSI-RS/SS measurements against the threshold value to determine that the uplink beam 210-a has failed.

In some cases, a failure in the uplink beam 210-a from UE 115-a may be identified at the base station 105-a. In such examples, the base station 105-a may configure the UE 115-a to transmit an SRS over ports which are QCL with the uplink beam 210-a ports. The base station 105-a may then measure the SRS ports and, from energy associated with the SRS ports, identify a beam failure of the uplink beam 210-a. In some cases, measurements may be compared against a threshold value and a failure determined based on the comparison.

In some cases, the UE 115-a may identify a failure in downlink beam 205-a from the base station 105-a. In some cases, the base station 105-a may indicate to the UE 115-a that it transmits the downlink beam 205-a using ports that are QCL with a downlink CSI-RS/SS port set. The UE 115-a can measure the CSI-RS/SS port set associated with downlink beam 205-a and, based on energy measured associated with the CSI-RS/SS port set, identify a beam failure via the measurements. In some cases, measurements may be compared against a threshold value and a failure determined based on the comparison. For example, if measured energy associated with the CSI-RS/SS port set is below an energy threshold value (e.g., 0 decibel or 5 decibel), the UE can infer that the downlink beam 205-a has failed, and trigger a beam recovery procedure.

In some cases, a failure of the downlink beam 205-a may be identified at the base station 105-a. In such cases, the base station 105-a may configure the UE 115-a to transmit a sounding reference signal (SRS) that is derived from the downlink beam 205-a using a set of antenna ports for the SRS. In such cases, the UE 115-a may derive the uplink beam from the downlink beam used to receive the downlink transmission (e.g., PDCCH) or SS/CSI-RS port sets. The base station 105-a may measure the SRS antenna ports and identify a beam failure based on the measurements (e.g., by comparing the measurements against a threshold value for determining a beam failure).

In some cases, upon detection of a beam failure, a beam recovery procedure may be initiated in which an indication of a beam failure may be transmitted using scheduling request (SR), a random access channel (RACH) resource, or PUCCH resource. In some cases, a base station may transmit an indication that one of a set of beams may have failed, and the UE may provide an indication of which beam of the set of beams failed, such as based on a received reference signal associated with one of the beams.

Figure 3:
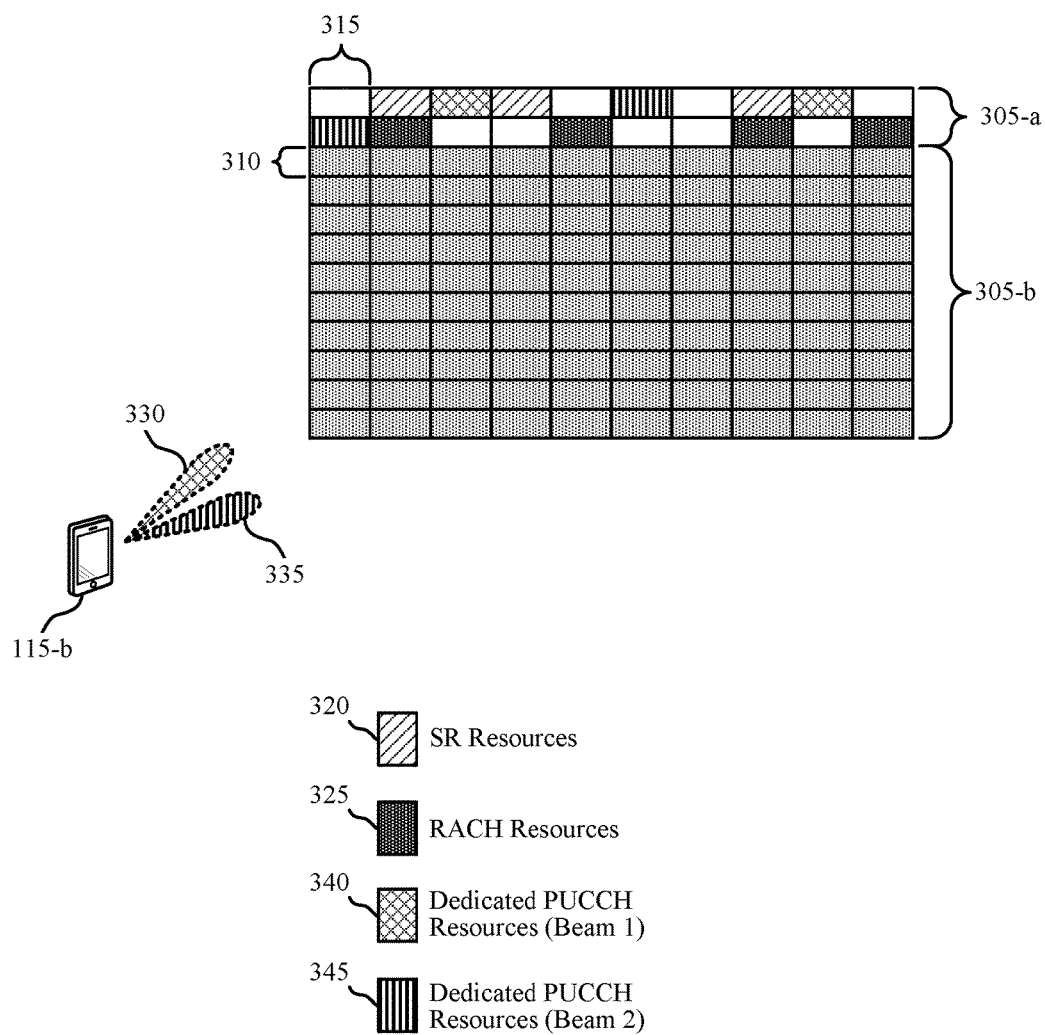
FIG. 3 illustrates an example of uplink resources that support beam failure identification and recovery techniques in accordance with aspects of the present disclosure.

FIG. 3 illustrates an example of uplink resources 300 that support beam failure identification and recovery techniques in accordance with various aspects of the present disclosure. The uplink resources 300 may, for example, be used by a UE 115 as described with reference to FIGS. 1 and 2. Uplink resources 300 may be associated with a given beam pair between a serving base station 105 (not shown) and a UE 115-b. Aspects of uplink resources 300 have been simplified for the sake of explanation. Accordingly, the arrangement and periodicity of the various resources described below may vary from what is depicted in FIG. 3.

Uplink resources 300 may include a first subset of resources 305-a and a second subset of resources 305-b within a system bandwidth. The first and second subset of resources 305-a may correspond to multiple subcarriers 310 over a number of symbol periods 315 (e.g., OFDM symbols). A block spanning one symbol period 315 and one subcarrier 310 may be referred to as a resource element (RE). Alternatively, each block may span a group of subcarriers 310 (e.g., 12 subcarriers) and one subframe (e.g., a TTI), such that each block may be referred to as a resource block. Accordingly, the units of frequency and time used in the present example may be arbitrary such that they are used for the sake of explanation only. The first subset of resources 305-a may be an example of control resources (i.e., resources over which control channel information may be transmitted). As an example, the first subset of resources 305-a may carry PUCCH and physical RACH (PRACH) transmissions from one or more UEs 115. The first subset of resources 305-a may contain RACH resources 325, SR resources 320, dedicated PUCCH resources for a first beam 340, and dedicated PUCCH resources for a second beam 345. In some cases, the RACH resources 325 and SR resources 320 may be multiplexed such that they may overlap in time or frequency (e.g., occupy the same symbol period 315 or subcarrier 310) but occupy different REs (e.g., do not overlap in time and frequency). The second subset of resources 305-b may be an example of resources in a data region of the system bandwidth. In aspects, the bandwidth of the second subset of resources 305-b may be wider than that of the first subset of resources 305-a. In some examples, resources 305-b may be used to carry PUSCH transmissions.

In some cases, UE 115-b may be able to communicate with a serving base station 105 over more than one active beam (e.g., active beams 330 and 335 in the present example). In the event of a beam failure, the UE 115-b may transmit an indication of the failure using one or more of the SR resources 320, RACH resources 325, dedicated PUCCH resources for the first beam 340, or dedicated PUCCH resources for the second beam 345. In some cases, the base station may identify the beam that failed based on the dedicated PUCCH resources for the particular beam that carry the failure indication. In other cases, dedicated PUCCH resources for particular beams may not be provided, and a PUCCH transmission may include an indication of a beam failure and the beam that failed may be determined based on configured beams at the UE 115-b or based on an indication of the particular beam that is transmitted in the PUCCH transmission. In some cases, the SR resources 320, RACH resources 325, and PUCCH resources 340-345 may be configured in uplink resources that will be monitored by the base station (e.g., via beam sweeping) and thus may be transmitted using a working uplink beam.

In some cases, after identifying a beam failure, the UE 115-b may signal the beam failure to the base station using one or more of the configured resources, (e.g. SR or PUCCH), and the indication may indicate that either an uplink beam has failed or a downlink beam has failed. Such an indication may allow the base station to trigger a recovery mechanism on a subset of beams, instead of all the beams.

In some cases, a base station may indicate a beam failure to UE 115-b. In some cases, the base station may be unaware of a particular beam of a set of beams that failed, and may indicate a set of beams that potentially failed to the UE 115-b. For example, the base station may transmit a DL grant via a PDCCH transmission associated with, e.g., a CSI-RS port P0, on a downlink beam and not receive a responsive PUCCH transmission associated with, e.g., a CSI-RS port P1, on an uplink beam. In such cases, either the PDCCH transmission beam has failed or the PUCCH transmission beam has failed, however, the base station 105 may not be able to identify which of the downlink beam or the uplink beam failed. In such case, the base station may signal to the UE 115-b that one of the PDCCH transmission beam corresponding to the CSI-RS port P0 or the PUCCH transmission beam corresponding to the CSI-RS port P1 has failed. Upon receiving the indication of a beam failure from the base station 105, the UE 115-b may down select the beam that has failed. For example, the UE 115-b can measure a signal strength of the CSI-RS port P0, e.g., by measuring an energy associated with the CSI-RS port P0 and comparing the measured energy with an energy threshold value (e.g., 0 decibel or 5 decibel). If the measured energy meets or exceeds the energy threshold value, the signal strength of the CSI-RS port P0 may be deemed good, and the UE 115-b can determine that the PUCCH transmission beam associated with the CSI-RS port P1 has failed. The UE 115-b may then initiate a beam recovery of the failed beam via, for example, SR resources 320. Alternatively, the UE 115-b may send a report to the base station 105, including the measurements of the PDCCH transmission beam having the good signal strength, or indicate that the PDCCH transmission beam having the good signal strength is still active. It will be understood that the examples discussed here are provided for discussion and illustration purposes, and that various other options may be used by the UE 115-b to determine which beam of a set of beams failed, and that various options for signaling the identified beam may be used (e.g., reporting of channel quality for different beams, etc.).

Figure 4:
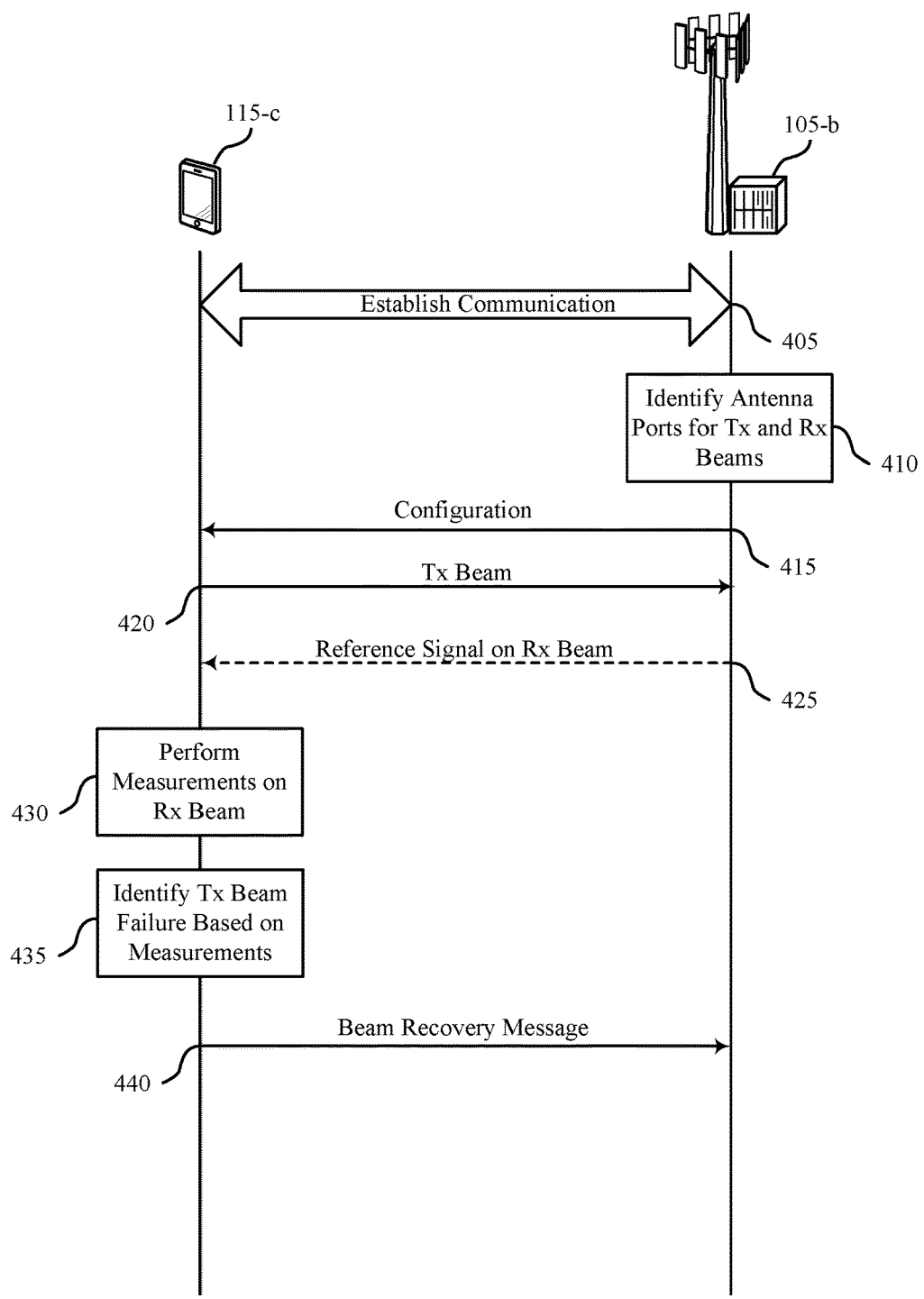
FIG. 4 illustrates an example of a process flow that supports beam failure identification and recovery techniques in accordance with aspects of the present disclosure.

FIG. 4 illustrates an example of a process flow 400 that supports beam failure identification and recovery techniques in accordance with various aspects of the present disclosure. Process flow 400 includes a UE 115-c and base station 105-b, each of which may be an example of the corresponding devices described above with reference to FIGS. 1 through 3.

At 405, UE 115-c and base station 105-b may establish a communication using one or more active beams. At 410, base station 105-b may identify antenna ports for transmit and receive beams. As discussed above, in some cases, the antenna ports may be identified for an uplink beam, and one or more CSI-RS/SS ports may be identified for downlink CSI-RS/SS transmissions of the base station 105-b. At 415 the base station 105-b may transmit the configuration to the UE 115-c. At 420 the UE 115-c may transmit an uplink transmit beam.

The UE 115-c may monitor reference signal and/or synchronization signal transmissions of a receive beam transmitted by the base station 105-b at 425. At block 430, the UE 115-c may perform measurement on the received beam. Such measurements may be, for example, reference signal measurements, synchronization signal measurements, or combinations thereof, and may be used to determine a signal quality value for the receive beam transmitted by the base station 105-b at 425.

The UE 115-c, at block 435, may identify a beam failure based on the measurements. In some cases, the UE 115-c may compare the signal quality value against a threshold value. If the signal quality value does not meet or exceed the threshold, a transmit beam failure of the uplink transmit beam transmitted by the UE 115-c at 420 may be identified. In the event that the UE 115-c identifies a transmit beam failure, a beam recovery message may be transmitted to the base station 105-b at 440. The base station 105-b may initiate a beam recovery procedure responsive to the beam recovery message transmitted at 440, in some cases.

Figure 5:
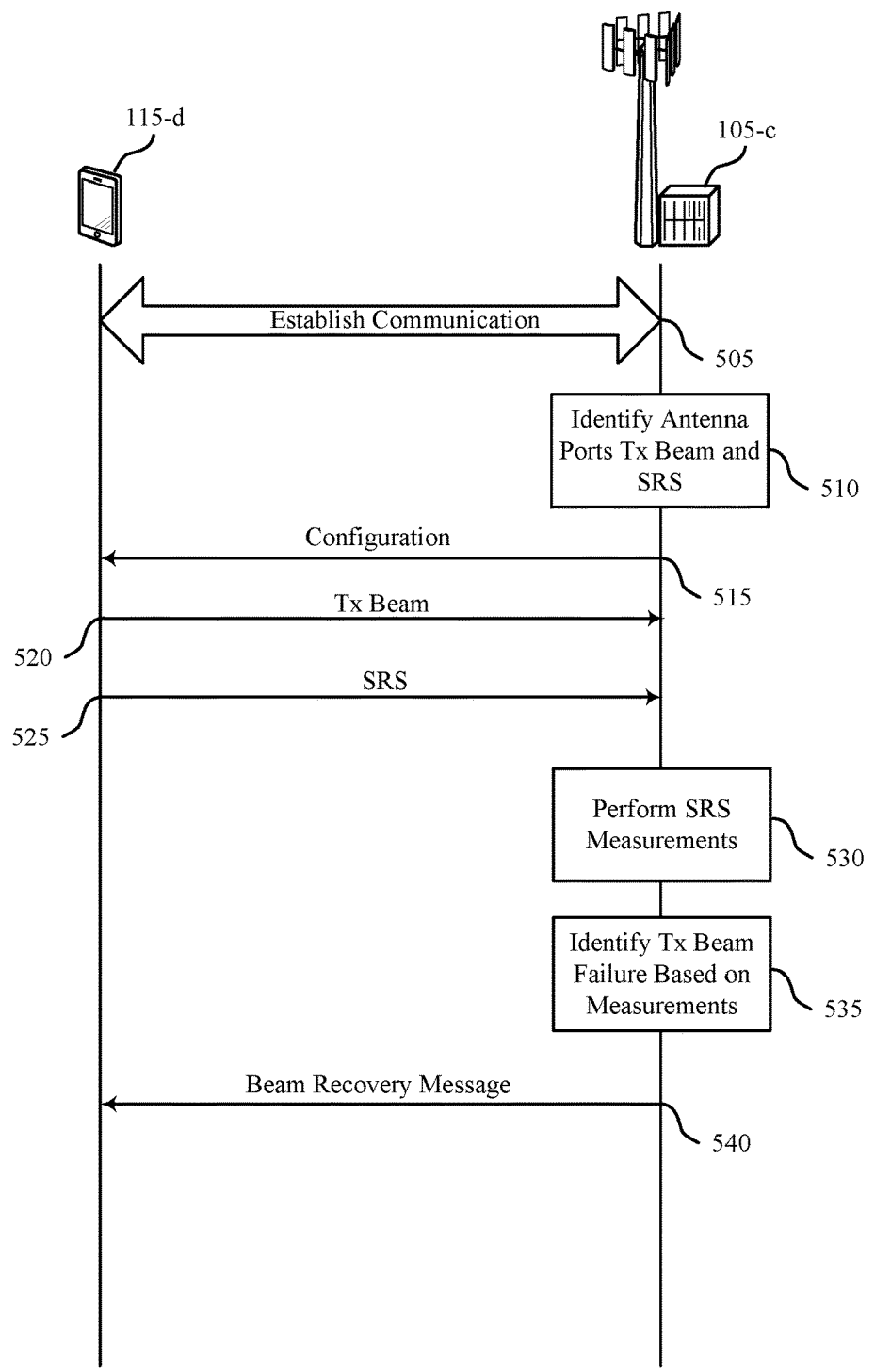
FIG. 5 illustrates an example of a process flow that supports beam failure identification and recovery techniques in accordance with aspects of the present disclosure.

FIG. 5 illustrates an example of a process flow 500 that supports beam failure identification and recovery techniques in accordance with various aspects of the present disclosure. Process flow 500 includes a UE 115-d and base station 105-c, each of which may be an example of the corresponding devices described above with reference to FIGS. 1 through 3.

At 505, UE 115-d and base station 105-c may establish a communication using one or more active beams. At 510, base station 105-c may identify antenna ports for a transmit beam, and for SRS transmissions. In some cases, the antenna ports may be identified for an uplink beam, and one or more SRS ports may be identified for uplink SRS transmissions to the base station 105-c. The base station 105-c may transmit, at 515, a configuration to the UE 115-d. At 520 the UE 115-d may transmit an uplink transmit beam.

At 525 the UE 115-d transmit SRS transmissions using the configured SRS ports, and the base station 105-c may monitor the SRS transmissions. At block 530, the base station 105-c may perform measurements on the received SRS transmissions. Such measurements may be, for example, reference signal measurements that may be used to determine a signal quality value for the uplink transmit beam transmitted at 520.

The base station 105-c, at block 535, may identify a beam failure based on the measurements. In some cases, the base station 105-c may compare a signal quality value against a threshold value, and if the signal quality value does not meet or exceed the threshold, a transmit beam failure of the uplink transmit beam transmitted at 520 may be identified. In the event that the base station 105-c identifies a transmit beam failure, at 540 a beam recovery message may be transmitted to the UE 115-d and a beam recovery procedure may be initiated.

Figure 6:
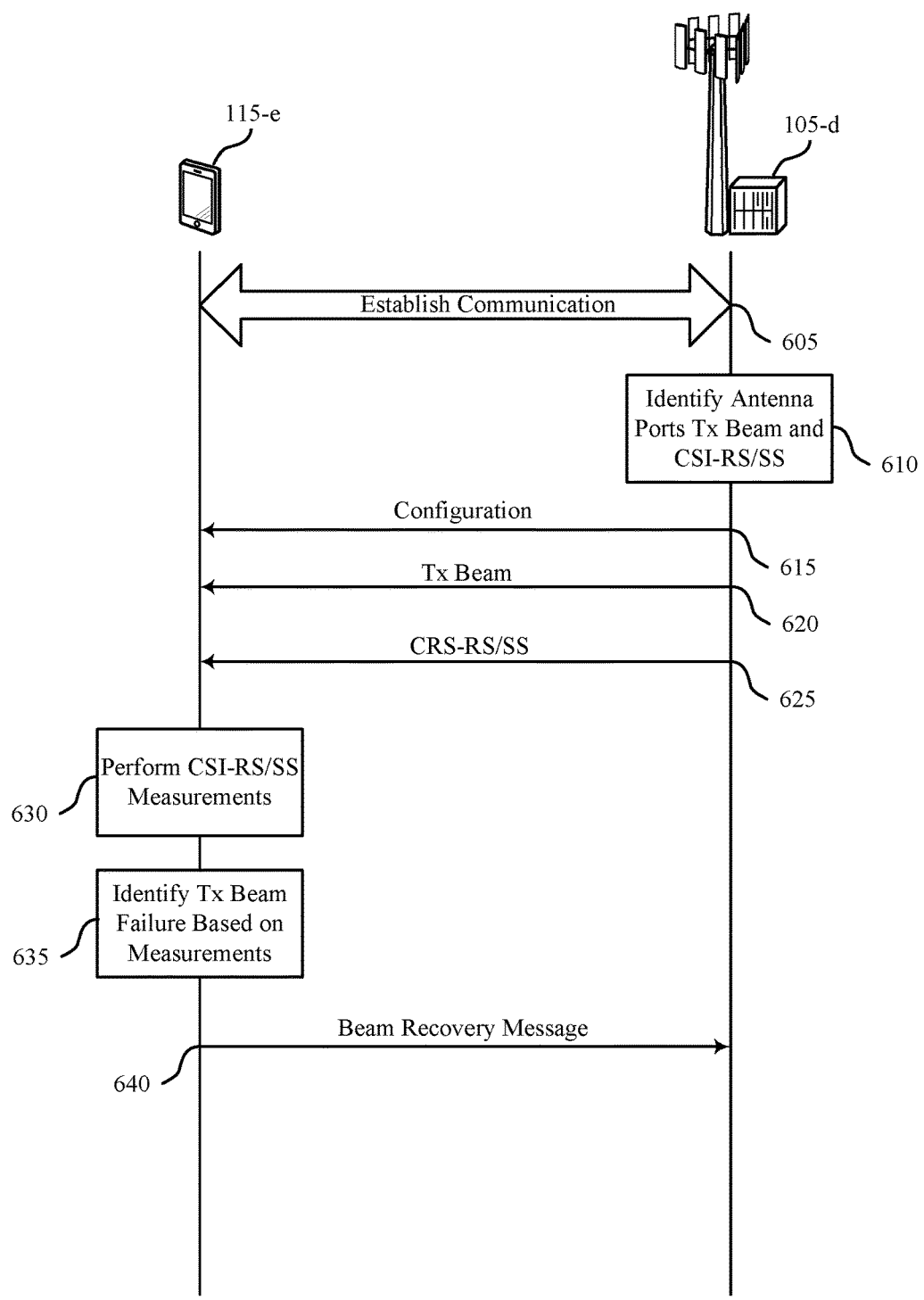
FIG. 6 illustrates an example of a process flow that supports beam failure identification and recovery techniques in accordance with aspects of the present disclosure.

FIG. 6 illustrates an example of a process flow 600 that supports beam failure identification and recovery techniques in accordance with various aspects of the present disclosure. Process flow 600 includes a UE 115-e and base station 105-d, each of which may be an example of the corresponding devices described above with reference to FIGS. 1 through 3.

At 605, UE 115-e and base station 105-d may establish a communication using one or more active beams. At 610, base station 105-d may identify antenna ports for a transmit beam, and for CSI-RS/SS transmissions. In some cases, the antenna ports may be identified for an uplink beam, and one or more CSI-RS/SS ports may be identified for downlink CSI-RS/SS transmissions to the UE 115-e. At 615 the base station 105-d may transmit a configuration to the UE 115-e.

The base station 105-d may transmit downlink transmit beam at 620, and may also transmit CSI-RS/SS transmissions at 625, each transmitted using the configured antenna ports. The UE 115-e, at block 630, may perform measurements on the received CSI-RS/SS transmissions. Such measurements may be, for example, reference signal measurements that may be used to determine a signal quality value for the downlink transmit beam transmitted at 620.

The UE 115-e, at block 635, may identify a beam failure based on the measurements. In some cases, the UE 115-e may compare a signal quality value against a threshold value, and if the signal quality value does not meet or exceed the threshold, a transmit beam failure of the downlink transmit beam transmitted at 620 may be identified. In the event that the UE 115-e identifies a transmit beam failure, a beam recovery message may be transmitted to the base station 105-d at 640 and a beam recovery procedure may be initiated. The beam recovery procedure may include a link reconfiguration between the UE 115-e and the base station 105-d. For example, a UE 115-e may be configured with a set of resource configurations which include active beams, and a set of CSI-RS resource configurations which includes candidate beams, and/or a set of SS/PBCH block indexes by a higher layer parameter (e.g., Candidate-Beam-RS-Identification-Resource) for radio link quality measurements on a serving cell, e.g., the base station 105-d. The UE 115-e may perform the radio link quality measurements on all of the active and candidate beams against thresholds configured by higher layers (e.g., a higher layer parameter Q-thresholds-RLC). Based on the radio link quality measurements, the UE 115-e may request a radio link reconfiguration to the base station 105-d. For example, if the radio link quality measurement is below a threshold, the UE transmits to the base station 105-d a RACH including the radio link reconfiguration request and an index of a QCL configuration of a new beam on a configured RACH resource (e.g., an SS Block 7). Then, the UE 115 monitors PDCCH, within a window configured by higher layer parameter (e.g., Beamfailure-recovery-request-window) according to antenna port quasi-collocation with the index of the new beam.

Figure 7:
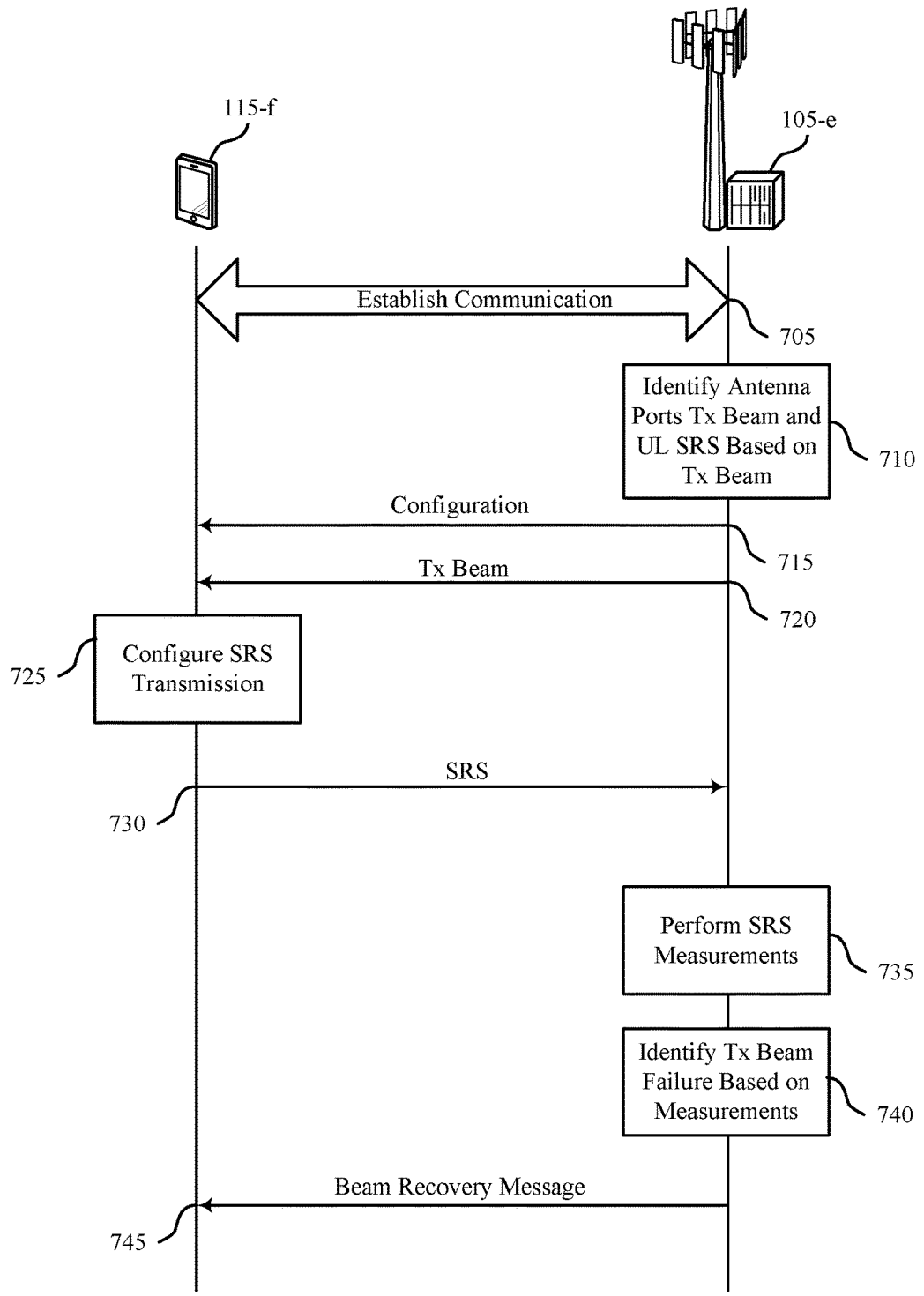
FIG. 7 illustrates an example of a process flow that supports beam failure identification and recovery techniques in accordance with aspects of the present disclosure.

FIG. 7 illustrates an example of a process flow 700 that supports beam failure identification and recovery techniques in accordance with various aspects of the present disclosure. Process flow 700 includes a UE 115-f and base station 105-e, each of which may be an example of the corresponding devices described above with reference to FIGS. 1 through 3.

At 705, UE 115-f and base station 105-e may establish a communication using one or more active beams. At 710, base station 105-e may identify antenna ports for a transmit beam, and for SRS transmissions. In some cases, the antenna ports may be identified based for an uplink beam, and one or more SRS ports may be identified for uplink SRS transmissions to the base station 105-e. At 715 the base station 105-e may transmit the configuration to the UE 115-f. The base station 105-e may transmit a downlink transmit beam at 720.

The UE 115-f, at block 725, may configure uplink SRS transmissions using the configured SRS ports, and may transmit SRS 730. The base station 105-*e*, at block 735, may monitor the SRS transmissions and perform measurements on the received SRS transmissions. Such measurements may be, for example, reference signal measurements that may be used to determine a signal quality value for the transmit beam transmitted at 720.

The base station 105-*e*, at block 740, may identify a beam failure based on the measurements. In some cases, the base station 105-*e* may compare a signal quality value against a threshold value. If the signal quality value does not meet or exceed the threshold, a transmit beam failure of the downlink transmit beam transmitted at 720 may be identified. In the event that the base station 105-*e* identifies a transmit beam failure, a beam recovery message may be transmitted to the UE 115-*f* at 745 and a beam recovery procedure may be initiated.

Figure 8:
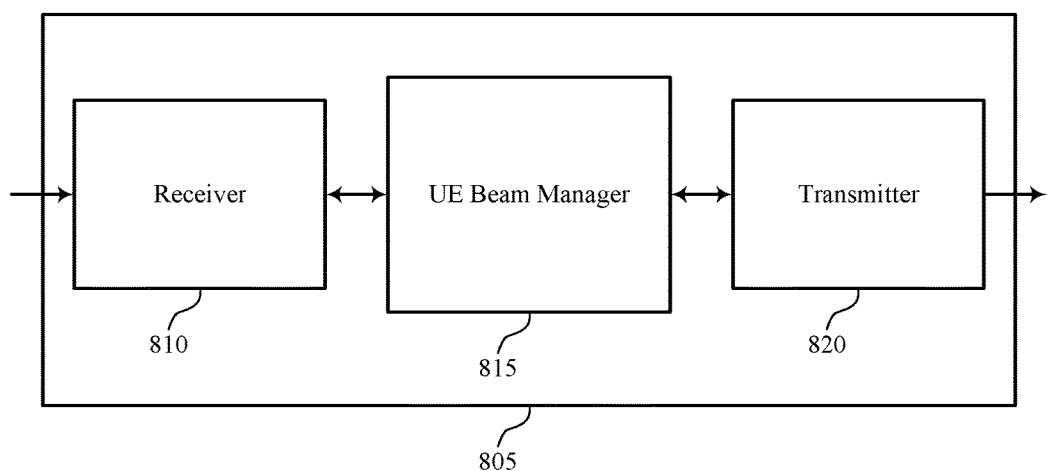
FIGS. 8 through 10 show block diagrams of a device that supports beam failure identification and recovery techniques in accordance with aspects of the present disclosure.

FIG. 8 shows a block diagram 800 of a wireless device 805 that supports beam failure identification and recovery techniques in accordance with aspects of the present disclosure. The wireless device 805 may be an example of aspects of a user equipment (UE) 115 as described with reference to FIG. 1. The wireless device 805 may include a receiver 810, a UE beam manager 815, and a transmitter 820. The wireless device 805 may also include a processor. Each of these components may be in communication with one another (e.g., via one or more buses).

The receiver 810 may receive information such as packets, user data, or control information associated with various information channels (e.g., control channels, data channels, and information related to beam failure identification and recovery techniques, etc.). Information may be passed on to other components of the device. The receiver 810 may be an example of aspects of the transceiver 1135 described with reference to FIG. 11. The receiver 810 may utilize a single antenna or a set of antennas.

The UE beam manager 815 may be an example of aspects of the UE beam manager 1115 described with reference to FIG. 11.

The UE beam manager 815 and/or at least some of its various sub-components may be implemented in hardware, software executed by a processor, firmware, or any combination thereof. If implemented in software executed by a processor, the functions of the UE beam manager 815 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The UE beam manager 815 and/or at least some of its various sub-components may be physically located at various positions, including being distributed such that portions of functions are implemented at different physical locations by one or more physical devices. In some examples, the UE beam manager 815 and/or at least some of its various sub-components may be a separate and distinct component in accordance with various aspects of the present disclosure. In other examples, the UE beam manager 815 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The UE beam manager 815 may identify a first set of antenna ports for a first transmission beam and a second set of antenna ports for a second transmission beam, where the second set of antenna ports is different than the first set of antenna ports, measure one or more signal characteristics of the second transmission beam, and trigger a beam recovery procedure for the first transmission beam based on the one or more measured signal characteristics of the second transmission beam.

The transmitter 820 may transmit signals generated by other components of the device. In some examples, the transmitter 820 may be collocated with a receiver 810 in a transceiver module. For example, the transmitter 820 may be an example of aspects of the transceiver 1135 described with reference to FIG. 11. The transmitter 820 may utilize a single antenna or a set of antennas.

Figure 9:
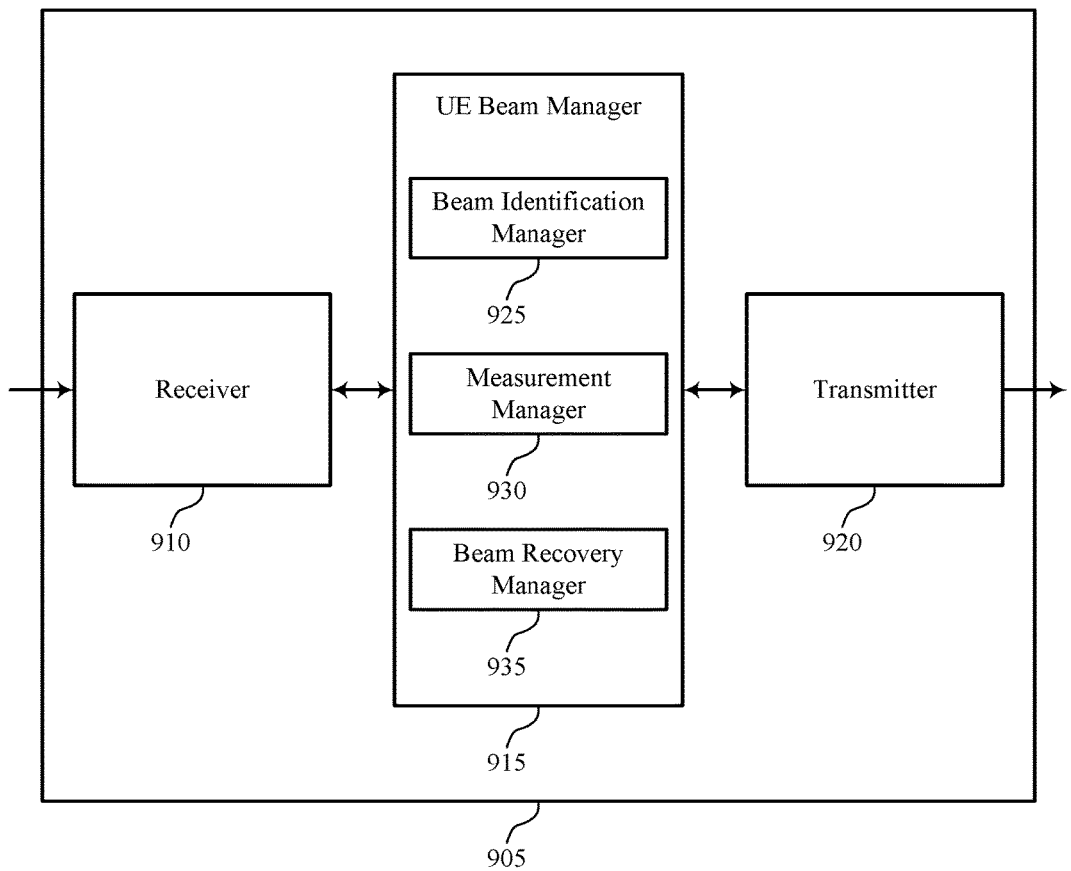

FIG. 9 shows a block diagram 900 of a wireless device 905 that supports beam failure identification and recovery techniques in accordance with aspects of the present disclosure. The wireless device 905 may be an example of aspects of a wireless device 805 or a UE 115 as described with reference to FIGS. 1 and 8. The wireless device 905 may include a receiver 910, a UE beam manager 915, and a transmitter 920. The wireless device 905 may also include a processor. Each of these components may be in communication with one another (e.g., via one or more buses).

The receiver 910 may receive information such as packets, user data, or control information associated with various information channels (e.g., control channels, data channels, and information related to beam failure identification and recovery techniques, etc.). Information may be passed on to other components of the device. The receiver 910 may be an example of aspects of the transceiver 1135 described with reference to FIG. 11. The receiver 910 may utilize a single antenna or a set of antennas.

The UE beam manager 915 may be an example of aspects of the UE beam manager 1115 described with reference to FIG. 11. UE beam manager 915 may also include beam identification manager 925, measurement manager 930, and beam recovery manager 935.

The beam identification manager 925 may identify a first set of antenna ports for a first transmission beam and a second set of antenna ports for a second transmission beam, where the second set of antenna ports is different than the first set of antenna ports.

The measurement manager 930 may measure one or more signal characteristics of the second transmission beam, determine, based on the measuring one or more signal characteristics, a beam failure. In some cases, the measurement manager 930 may receive downlink reference signal transmissions, and determine a beam failure of the first transmission beam based on the received downlink reference signal transmissions. The measurement manager 930 also may receive the first transmission beam using the first set of antenna ports, derive a reference signal from the received first transmission beam, and transmit the reference signal in the second transmission beam. In some cases, the measuring the one or more signal characteristics of the second transmission beam includes measuring one or more of the RS or SS received on the second set of ports to obtain a channel quality value, and comparing the channel quality value to a threshold value associated with a failure of the first transmission beam.

The beam recovery manager 935 may trigger a beam recovery procedure for the first transmission beam based on the one or more measured signal characteristics of the second transmission beam. The beam recovery manager 935 may also receive a signal indicating that the first transmission beam or the second transmission beam was unsuccessfully received. In some cases, the triggering the beam recovery procedure includes transmitting an indication of a beam failure using a configured transmission resource. In some cases, the indication of the beam failure includes an indication of one or more of a transmission beam failure or a reception beam failure. In some cases, the first transmission beam is a downlink transmission beam from a base station and the second transmission beam is an uplink transmission beam to the base station, and where the triggering the beam recovery procedure includes transmitting an indication that one or more of the uplink transmission beam or the downlink transmission beam were unsuccessfully received. In some cases, the triggering the beam recovery procedure includes transmitting an indication of a first transmission beam failure responsive to the channel quality value being below the threshold value.

The transmitter 920 may transmit signals generated by other components of the device. In some examples, the transmitter 920 may be collocated with a receiver 910 in a transceiver module. For example, the transmitter 920 may be an example of aspects of the transceiver 1135 described with reference to FIG. 11. The transmitter 920 may utilize a single antenna or a set of antennas.

Figure 10:
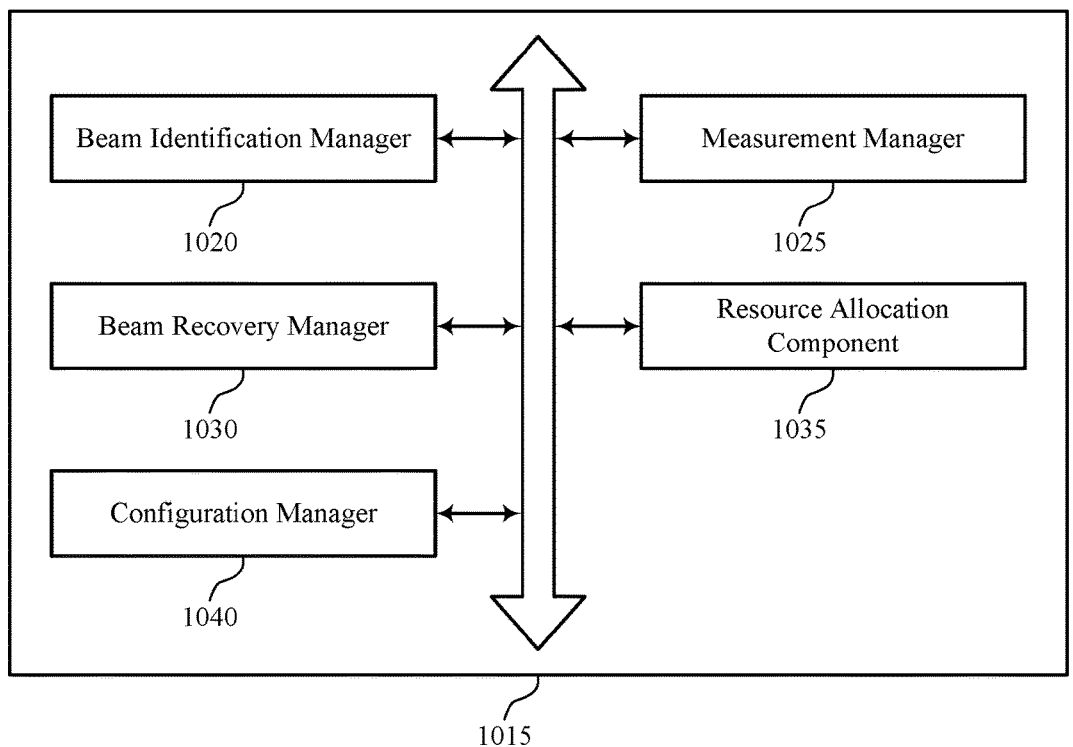

FIG. 10 shows a block diagram 1000 of a UE beam manager 1015 that supports beam failure identification and recovery techniques in accordance with aspects of the present disclosure. The UE beam manager 1015 may be an example of aspects of a UE beam manager 815, a UE beam manager 915, or a UE beam manager 1115 described with reference to FIGS. 8, 9, and 11. The UE beam manager 1015 may include a beam identification manager 1020, a measurement manager 1025, a beam recovery manager 1030, resource allocation component 1035, and a configuration manager 1040. Each of these modules may communicate, directly or indirectly, with one another (e.g., via one or more buses).

The beam identification manager 1020 may identify a first set of antenna ports for a first transmission beam and a second set of antenna ports for a second transmission beam, where the second set of antenna ports is different than the first set of antenna ports.

The measurement manager 1025 may measure one or more signal characteristics of the second transmission beam, determine, based on the measuring one or more signal characteristics, a beam failure. In some cases, the measurement manager 1025 may receive downlink reference signal transmissions, and determine a beam failure of the first transmission beam based on the received downlink reference signal transmissions. The measurement manager 1025 also may receive the first transmission beam using the first set of antenna ports, derive a reference signal from the received first transmission beam, and transmit the reference signal in the second transmission beam. In some cases, the measuring the one or more signal characteristics of the second transmission beam includes measuring one or more of the RS or SS received on the second set of ports to obtain a channel quality value, and comparing the channel quality value to a threshold value associated with a failure of the first transmission beam.

The beam recovery manager 1030 may trigger a beam recovery procedure for the first transmission beam based on the one or more measured signal characteristics of the second transmission beam. The beam recovery manager 1030 may also receive a signal indicating that the first transmission beam or the second transmission beam was unsuccessfully received. In some cases, the triggering the beam recovery procedure includes transmitting an indication of a beam failure using a configured transmission resource. In some cases, the indication of the beam failure includes an indication of one or more of a transmission beam failure or a reception beam failure. In some cases, the first transmission beam is a downlink transmission beam from a base station and the second transmission beam is an uplink transmission beam to the base station, and where the triggering the beam recovery procedure includes transmitting an indication that one or more of the uplink transmission beam or the downlink transmission beam were unsuccessfully received. In some cases, the triggering the beam recovery procedure includes transmitting an indication of a first transmission beam failure responsive to the channel quality value being below the threshold value.

The resource allocation component 1035 may, in some cases, identify that the configured transmission resource includes one or more of a SR resource or a physical uplink control channel (PUCCH) resource that is configured for transmitting the indication of the beam failure. The configuration manager 1040 may, in some cases, identify the first set of antenna ports and the second set of antenna ports by receiving a configuration to use the first set of antenna ports for the first transmission beam and to use the second set of antenna ports for measuring one or more of a RS or SS provided over the second transmission beam. In some cases, the second set of antenna ports are QCL with the first set of antenna ports. In some cases, the identifying the first set of antenna ports and the second set of antenna ports includes receiving a configuration of the first set of antenna ports for transmissions of downlink transmission beams, and receiving a configuration of the second set of antenna ports for downlink reference signal transmissions, where the second set of antenna ports are QCL with the first set of antenna ports. In some cases, the identifying the first set of antenna ports and the second set of antenna ports includes receiving a configuration of the first set of antenna ports for transmission of a downlink transmission beam as the first transmission beam, and receiving a configuration of the second set of antenna ports for transmissions of an uplink transmission beam as the second transmission beam, the uplink transmission beam including a reference signal that is derived from the first transmission beam.

Figure 11:
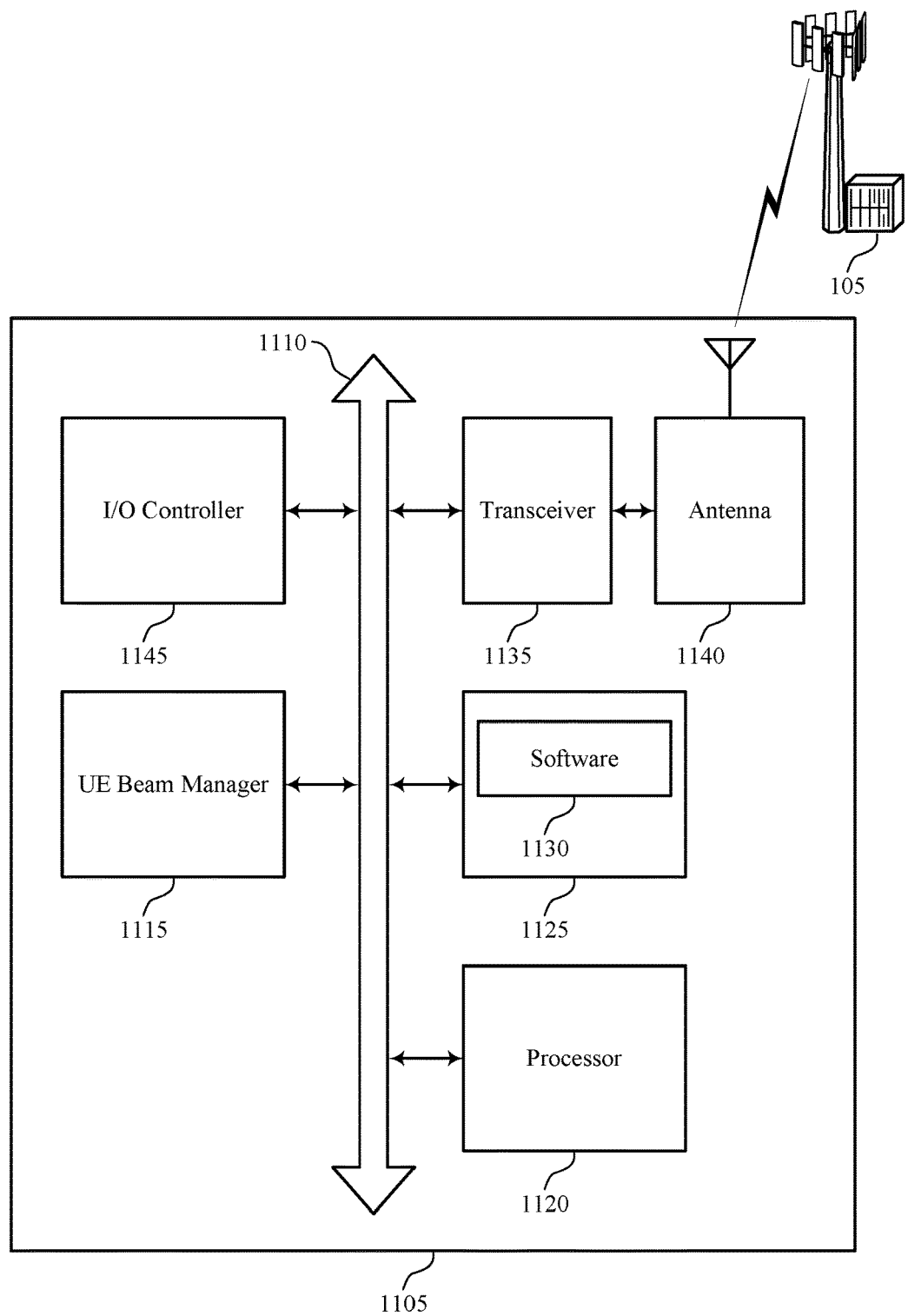
FIG. 11 illustrates a block diagram of a system including a UE that supports beam failure identification and recovery techniques in accordance with aspects of the present disclosure.

FIG. 11 shows a diagram of a system 1100 including a device 1105 that supports beam failure identification and recovery techniques in accordance with aspects of the present disclosure. The device 1105 may be an example of or include the components of wireless device 805, wireless device 905, or a UE 115 as described above, e.g., with reference to FIGS. 1, 8 and 9. The device 1105 may include components for bi-directional voice and data communications including components for transmitting and receiving communications, including a UE beam manager 1115, a processor 1120, a memory 1125, a software 1130, a transceiver 1135, an antenna 1140, and an I/O controller 1145. These components may be in electronic communication via one or more busses (e.g., bus 1110). The device 1105 may communicate wirelessly with one or more base stations 105.

The processor 1120 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1120 may be configured to operate a memory array using a memory controller. In other cases, a memory controller may be integrated into the processor 1120. The processor 1120 may be configured to execute computer-readable instructions stored in a memory to perform various functions (e.g., functions or tasks supporting beam failure identification and recovery techniques).

The memory 1125 may include random access memory (RAM) and read only memory (ROM). The memory 1125 may store a computer-readable, computer-executable software 1130 including instructions that, when executed, cause the processor to perform various functions described herein. In some cases, the memory 1125 may contain, among other things, a basic input/output system (BIOS) which may control basic hardware and/or software operation such as the interaction with peripheral components or devices.

The software 1130 may include a code to implement aspects of the present disclosure, including a code to support beam failure identification and recovery techniques. The software 1130 may be stored in a non-transitory computer-readable medium such as a system memory or other memory. In some cases, the software 1130 may not be directly executable by the processor but may cause a computer (e.g., when compiled and executed) to perform functions described herein.

The transceiver 1135 may communicate bi-directionally, via one or more antennas, wired, or wireless links as described above. For example, the transceiver 1135 may represent a wireless transceiver and may communicate bi-directionally with another wireless transceiver. The transceiver 1135 may also include a modem to modulate the packets and provide the modulated packets to the antennas for transmission, and to demodulate packets received from the antennas.

In some cases, the wireless device 1105 may include a single antenna 1140. However, in some cases the device 1105 may have more than one antenna 1140, which may be capable of concurrently transmitting or receiving multiple wireless transmissions.

The I/O controller 1145 may manage input and output signals for the device 1105. The I/O controller 1145 may also manage peripherals not integrated into the device 1105. In some cases, the I/O controller 1145 may represent a physical connection or port to an external peripheral. In some cases, the I/O controller 1145 may utilize an operating system such as iOS®, ANDROID®, MS-DOS®, MS-WINDOWS®, OS/2®, UNIX®, LINUX®, or another known operating system. In other cases, the I/O controller 1145 may represent or interact with a modem, a keyboard, a mouse, a touch-screen, or a similar device. In some cases, the I/O controller 1145 may be implemented as part of a processor. In some cases, a user may interact with the device 1105 via the I/O controller 1145 or via hardware components controlled by the I/O controller 1145.

Figure 12:
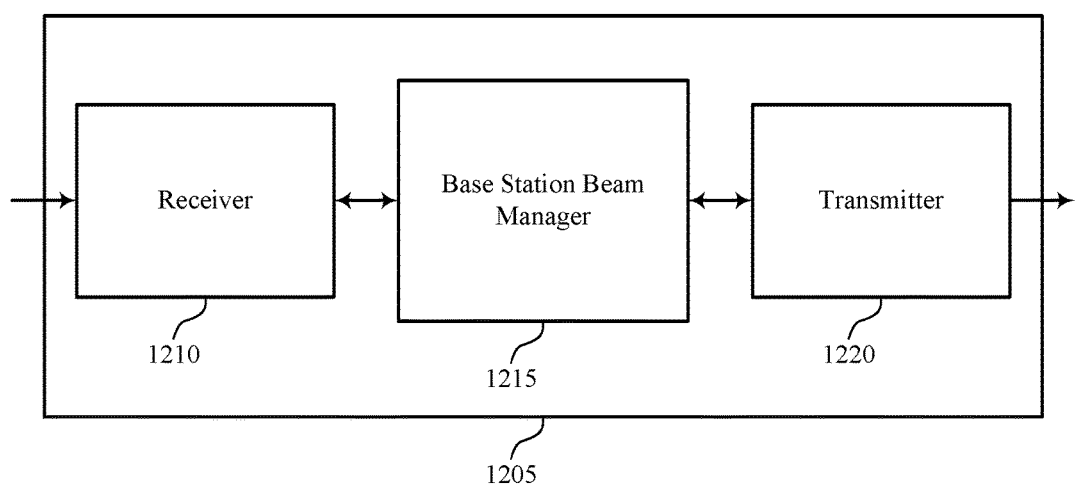
FIGS. 12 through 14 show block diagrams of a device that supports beam failure identification and recovery techniques in accordance with aspects of the present disclosure.

FIG. 12 shows a block diagram 1200 of a wireless device 1205 that supports beam failure identification and recovery techniques in accordance with aspects of the present disclosure. The wireless device 1205 may be an example of aspects of a base station 105 as described with reference to FIG. 1. The wireless device 1205 may include a receiver 1210, a base station beam manager 1215, and a transmitter 1220. The wireless device 1205 may also include a processor. Each of these components may be in communication with one another (e.g., via one or more buses).

The receiver 1210 may receive information such as packets, user data, or control information associated with various information channels (e.g., control channels, data channels, and information related to beam failure identification and recovery techniques, etc.). Information may be passed on to other components of the device. The receiver 1210 may be an example of aspects of the transceiver 1535 described with reference to FIG. 15. The receiver 1210 may utilize a single antenna or a set of antennas.

The base station beam manager 1215 may be an example of aspects of the base station beam manager 1515 described with reference to FIG. 15.

The base station beam manager 1215 and/or at least some of its various sub-components may be implemented in hardware, software executed by a processor, firmware, or any combination thereof. If implemented in software executed by a processor, the functions of the base station beam manager 1215 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station beam manager 1215 and/or at least some of its various sub-components may be physically located at various positions, including being distributed such that portions of functions are implemented at different physical locations by one or more physical devices. In some examples, the base station beam manager 1215 and/or at least some of its various sub-components may be a separate and distinct component in accordance with various aspects of the present disclosure. In other examples, the base station beam manager 1215 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The base station beam manager 1215 may identify a first set of antenna ports for a first transmission beam and a second set of antenna ports for a second transmission beam, where the second set of antenna ports is different than the first set of antenna ports, determine a beam failure of the first transmission beam based on the second transmission beam, and trigger a beam recovery procedure for the first transmission beam based on the determination of the beam failure of the first transmission beam.

The transmitter 1220 may transmit signals generated by other components of the device. In some examples, the transmitter 1220 may be collocated with a receiver 1210 in a transceiver module. For example, the transmitter 1220 may be an example of aspects of the transceiver 1535 described with reference to FIG. 15. The transmitter 1220 may utilize a single antenna or a set of antennas.

Figure 13:
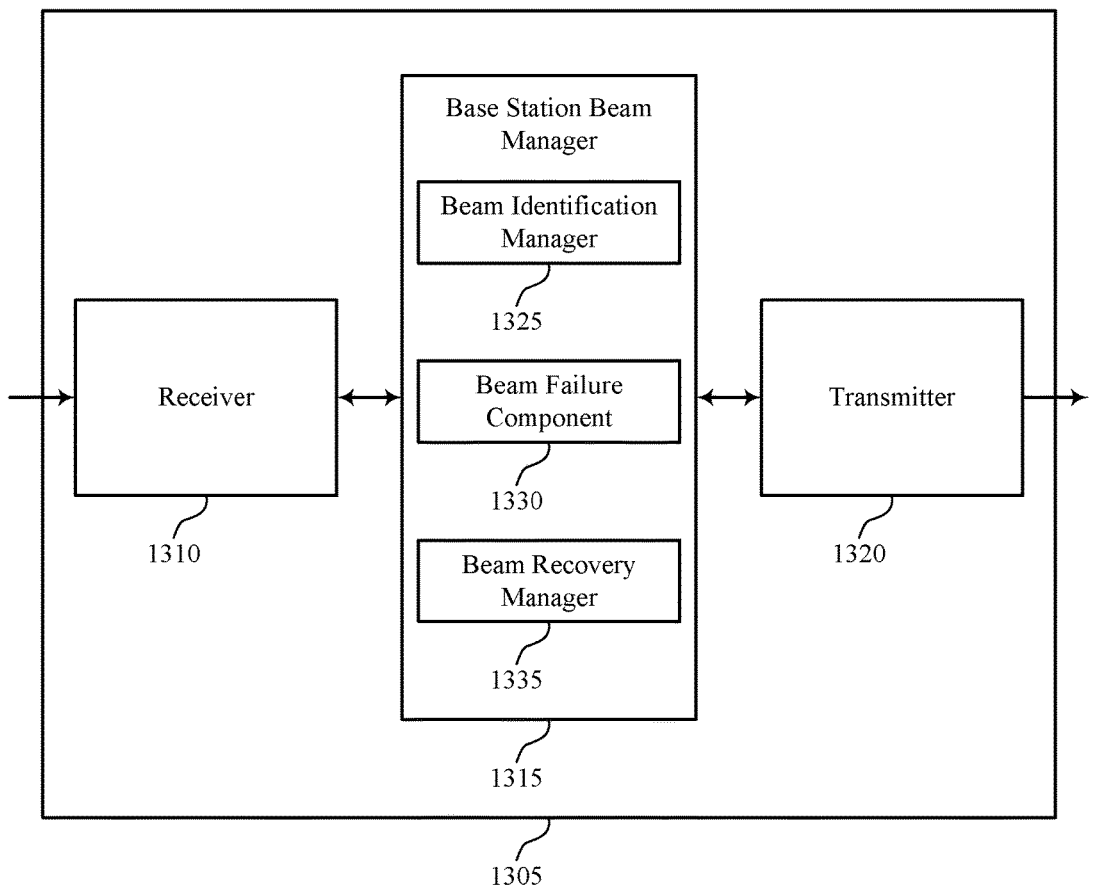

FIG. 13 shows a block diagram 1300 of a wireless device 1305 that supports beam failure identification and recovery techniques in accordance with aspects of the present disclosure. The wireless device 1305 may be an example of aspects of a wireless device 1205 or a base station 105 as described with reference to FIGS. 1 and 12. The wireless device 1305 may include a receiver 1310, a base station beam manager 1315, and a transmitter 1320. The wireless device 1305 may also include a processor. Each of these components may be in communication with one another (e.g., via one or more buses).

The receiver 1310 may receive information such as packets, user data, or control information associated with various information channels (e.g., control channels, data channels, and information related to beam failure identification and recovery techniques, etc.). Information may be passed on to other components of the device. The receiver 1310 may be an example of aspects of the transceiver 1535 described with reference to FIG. 15. The receiver 1310 may utilize a single antenna or a set of antennas.

The base station beam manager 1315 may be an example of aspects of the base station beam manager 1515 described with reference to FIG. 15. The base station beam manager 1315 may also include a beam identification manager 1325, a beam failure component 1330, and a beam recovery manager 1335.

The beam identification manager 1325 may identify a first set of antenna ports for a first transmission beam and a second set of antenna ports for a second transmission beam, where the second set of antenna ports is different than the first set of antenna ports.

The beam failure component 1330 may determine a beam failure of the first transmission beam based on the second transmission beam, or receive a signal indicating an uplink transmission beam or downlink transmission beam was unsuccessfully received. The beam failure component 1330 may also transmit, based on non-receipt of the transmission, a signal indicating that the first transmission beam or the second transmission beam was unsuccessfully received. The beam failure component 1330 may also determine a beam failure of the first transmission beam based on the measured reference signal. In some cases, the first transmission beam is a downlink transmission beam to a UE and the second transmission beam is an uplink transmission beam from the UE, and where the triggering the beam recovery procedure includes receiving an indication of a beam failure of one or more of the uplink transmission beam or the downlink transmission beam.

The beam recovery manager 1335 may receive an indication of which of the first transmission beam or the second transmission was unsuccessfully received, and trigger a beam recovery procedure for the first transmission beam based on the determination of the beam failure of the first transmission beam. In some cases, the downlink transmission beam may be retransmitted responsive to a signal indicating that the downlink transmission beam failed. In some cases, the triggering the beam recovery procedure includes receiving an indication of a first transmission beam failure responsive to the channel quality value being below the threshold value.

The transmitter 1320 may transmit signals generated by other components of the device. In some examples, the transmitter 1320 may be collocated with a receiver 1310 in a transceiver module. For example, the transmitter 1320 may be an example of aspects of the transceiver 1535 described with reference to FIG. 15. The transmitter 1320 may utilize a single antenna or a set of antennas.

Figure 14:
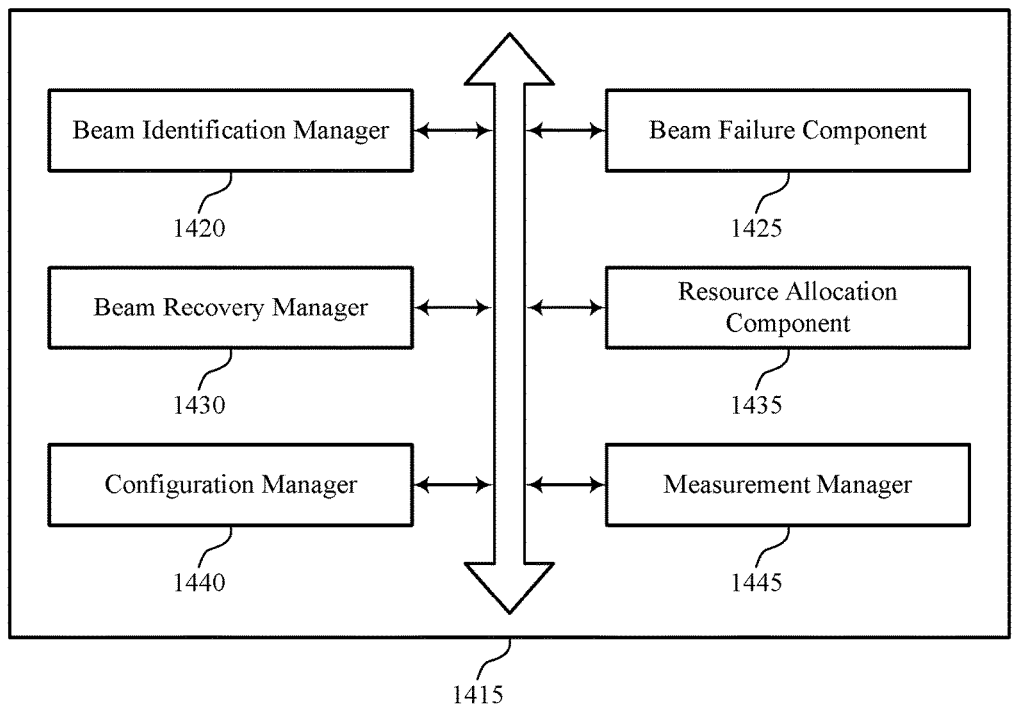

FIG. 14 shows a block diagram 1400 of a base station beam manager 1415 that supports beam failure identification and recovery techniques in accordance with aspects of the present disclosure. The base station beam manager 1415 may be an example of aspects of a base station beam manager 1515 described with reference to FIGS. 12, 13, and 15. The base station beam manager 1415 may include a beam identification manager 1420, a beam failure component 1425, a beam recovery manager 1430, a resource allocation component 1435, a configuration manager 1440, and a measurement manager 1445. Each of these modules may communicate, directly or indirectly, with one another (e.g., via one or more buses).

The beam identification manager 1420 may identify a first set of antenna ports for a first transmission beam and a second set of antenna ports for a second transmission beam, where the second set of antenna ports is different than the first set of antenna ports.

The beam failure component 1425 may determine a beam failure of the first transmission beam based on the second transmission beam, or receive a signal indicating an uplink transmission beam or downlink transmission beam was unsuccessfully received. The beam failure component 1425 may also transmit, based on non-receipt of the transmission, a signal indicating that the first transmission beam or the second transmission beam was unsuccessfully received. The beam failure component 1425 may also determine a beam failure of the first transmission beam based on the measured reference signal. In some cases, the first transmission beam is a downlink transmission beam to a UE and the second transmission beam is an uplink transmission beam from the UE, and where the triggering the beam recovery procedure includes receiving an indication of beam failure of one or more of the uplink transmission beam or the downlink transmission beam.

The beam recovery manager 1430 may receive an indication of which of the first transmission beam or the second transmission was unsuccessfully received, and trigger a beam recovery procedure for the first transmission beam based on the determination of the beam failure of the first transmission beam. In some cases, the downlink transmission beam may be retransmitted responsive to a signal indicating that the downlink transmission beam failed. In some cases, the triggering the beam recovery procedure includes receiving an indication of a first transmission beam failure responsive to the channel quality value being below the threshold value.

The resource allocation component 1435 may configure a transmission resource to indicate a beam failure in the beam recovery procedure, where the transmission resource includes one or more of a SR resource or a PUCCH resource that is configured for transmitting the indication of the beam failure.

The configuration manager 1440 may identify the first set of antenna ports and the second set of antenna ports by configuring a UE to use the first set of antenna ports for reception of the first transmission beam and to use the second set of antenna ports for measuring one or more of a channel state information (CSI)-RS or SS provided over the second transmission beam. In some cases, the identifying the first set of antenna ports and the second set of antenna ports includes configuring the first set of antenna ports for transmissions of uplink transmission beams, and configuring the second set of antenna ports for uplink reference signal transmissions, where the second set of antenna ports are QCL with the first set of antenna ports. In some cases, the identifying the first set of antenna ports and the second set of antenna ports includes configuring the first set of antenna ports for transmissions of downlink transmission beams, and configuring the second set of antenna ports for downlink reference signal transmissions, where the second set of antenna ports are QCL with the first set of antenna ports. In some cases, the identifying the first set of antenna ports and the second set of antenna ports includes configuring the first set of antenna ports for transmission of a downlink transmission beam as the first transmission beam, and configuring the second set of antenna ports for transmissions of an uplink transmission beam as the second transmission beam, the uplink transmission beam including a reference signal that is derived from the first transmission beam.

The measurement manager 1445 may receive the uplink reference signal transmissions, determine a beam failure of the first transmission beam based on the received uplink reference signal transmissions, and where the triggering the beam recovery procedure for the first transmission beam is based on the determining the beam failure, and measure the reference signal included in the second transmission beam.

Figure 15:
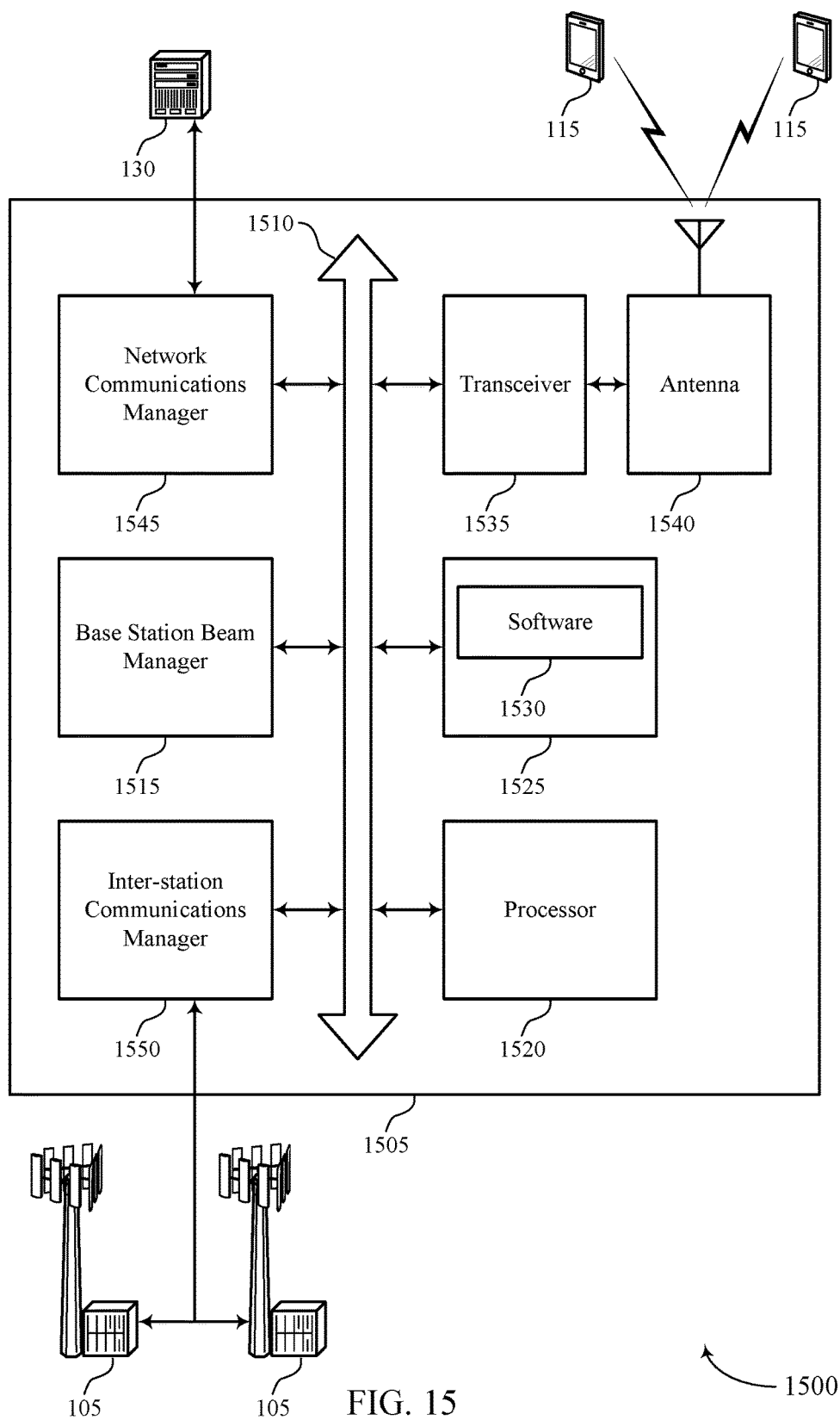
FIG. 15 illustrates a block diagram of a system including a base station that supports beam failure identification and recovery techniques in accordance with aspects of the present disclosure.

FIG. 15 shows a diagram of a system 1500 including a device 1505 that supports beam failure identification and recovery techniques in accordance with aspects of the present disclosure. The device 1505 may be an example of or include the components of base station 105 as described above, e.g., with reference to FIG. 1. The device 1505 may include components for bi-directional voice and data communications including components for transmitting and receiving communications, including a base station beam manager 1515, a processor 1520, a memory 1525, a software 1530, a transceiver 1535, an antenna 1540, a network communications manager 1545, and an inter-station communications manager 1550. These components may be in electronic communication via one or more busses (e.g., bus 1510). The device 1505 may communicate wirelessly with one or more UEs 115.

The processor 1520 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1520 may be configured to operate a memory array using a memory controller. In other cases, a memory controller may be integrated into processor 1520. The processor 1520 may be configured to execute computer-readable instructions stored in a memory to perform various functions (e.g., functions or tasks supporting beam failure identification and recovery techniques).

The memory 1525 may include a RAM and a ROM. The memory 1525 may store computer-readable, computer-executable software 1530 including instructions that, when executed, cause the processor to perform various functions described herein. In some cases, the memory 1525 may contain, among other things, a BIOS which may control basic hardware and/or software operation such as the interaction with peripheral components or devices.

The software 1530 may include a code to implement aspects of the present disclosure, including a code to support beam failure identification and recovery techniques. Software 1530 may be stored in a non-transitory computer-readable medium such as a system memory or other memory. In some cases, the software 1530 may not be directly executable by the processor but may cause a computer (e.g., when compiled and executed) to perform functions described herein.

The transceiver 1535 may communicate bi-directionally, via one or more antennas, wired, or wireless links as described above. For example, the transceiver 1535 may represent a wireless transceiver and may communicate bi-directionally with another wireless transceiver. The transceiver 1535 may also include a modem to modulate the packets and provide the modulated packets to the antennas for transmission, and to demodulate packets received from the antennas.

In some cases, the wireless device 1505 may include a single antenna 1540. However, in some cases the device 1505 may have more than one antenna 1540, which may be capable of concurrently transmitting or receiving multiple wireless transmissions.

The network communications manager 1545 may manage communications with the core network (e.g., via one or more wired backhaul links). For example, the network communications manager 1545 may manage the transfer of data communications for client devices, such as one or more UEs 115.

The inter-station communications manager 1550 may manage communications with other base station 105, and may include a controller or scheduler for controlling communications with UEs 115 in cooperation with other base stations 105. For example, the inter-station communications manager 1550 may coordinate scheduling for transmissions to UEs 115 for various interference mitigation techniques such as beamforming or joint transmission. In some examples, the inter-station communications manager 1550 may provide an X2 interface within an Long Term Evolution (LTE)/LTE-A wireless communication network technology to provide communication between base stations 105.

Figure 16:
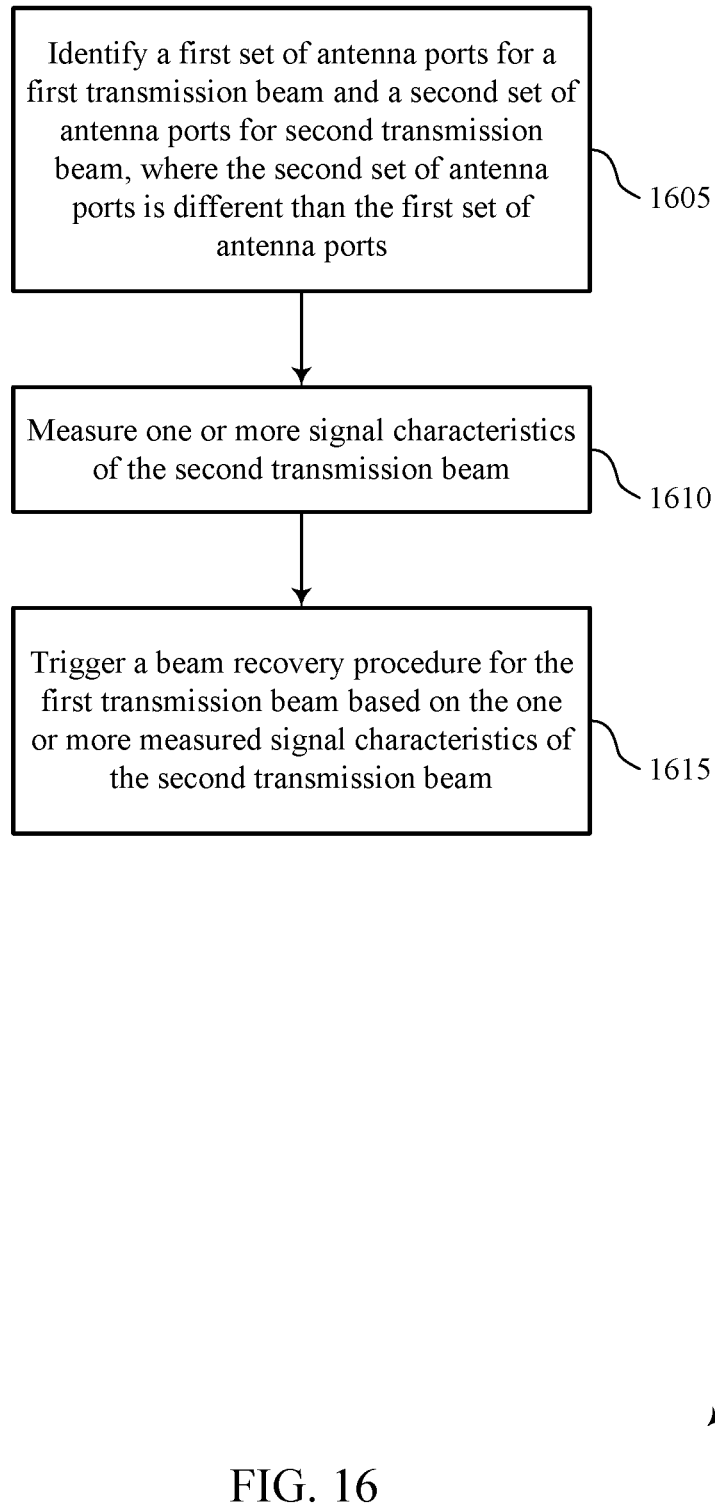
FIGS. 16 through 19 illustrate methods for beam failure identification and recovery techniques in accordance with aspects of the present disclosure.

FIG. 16 shows a flowchart illustrating a method 1600 for beam failure identification and recovery techniques in accordance with aspects of the present disclosure. The operations of method 1600 may be implemented by a UE 115 or its components as described herein. For example, the operations of method 1600 may be performed by a UE beam manager as described with reference to FIGS. 8 through 11. In some examples, a UE 115 may execute a set of codes to control the functional elements of the device to perform the functions described below. Additionally or alternatively, the UE 115 may perform aspects of the functions described below using special-purpose hardware.

At block 1605 the UE 115 may identify a first set of antenna ports for a first transmission beam and a second set of antenna ports for a second transmission beam, wherein the second set of antenna ports is different than the first set of antenna ports. The operations of block 1605 may be performed according to the methods described with reference to FIGS. 1 through 7. In certain examples, aspects of the operations of block 1605 may be performed by a beam identification manager as described with reference to FIGS. 8 through 11.

At block 1610 the UE 115 may measure one or more signal characteristics of the second transmission beam. The operations of block 1610 may be performed according to the methods described with reference to FIGS. 1 through 7. In certain examples, aspects of the operations of block 1610 may be performed by a measurement manager as described with reference to FIGS. 8 through 11.

At block 1615 the UE 115 may trigger a beam recovery procedure for the first transmission beam based at least in part on the one or more measured signal characteristics of the second transmission beam. The operations of block 1615 may be performed according to the methods described with reference to FIGS. 1 through 7. In certain examples, aspects of the operations of block 1615 may be performed by a beam recovery manager as described with reference to FIGS. 8 through 11.

Figure 17:
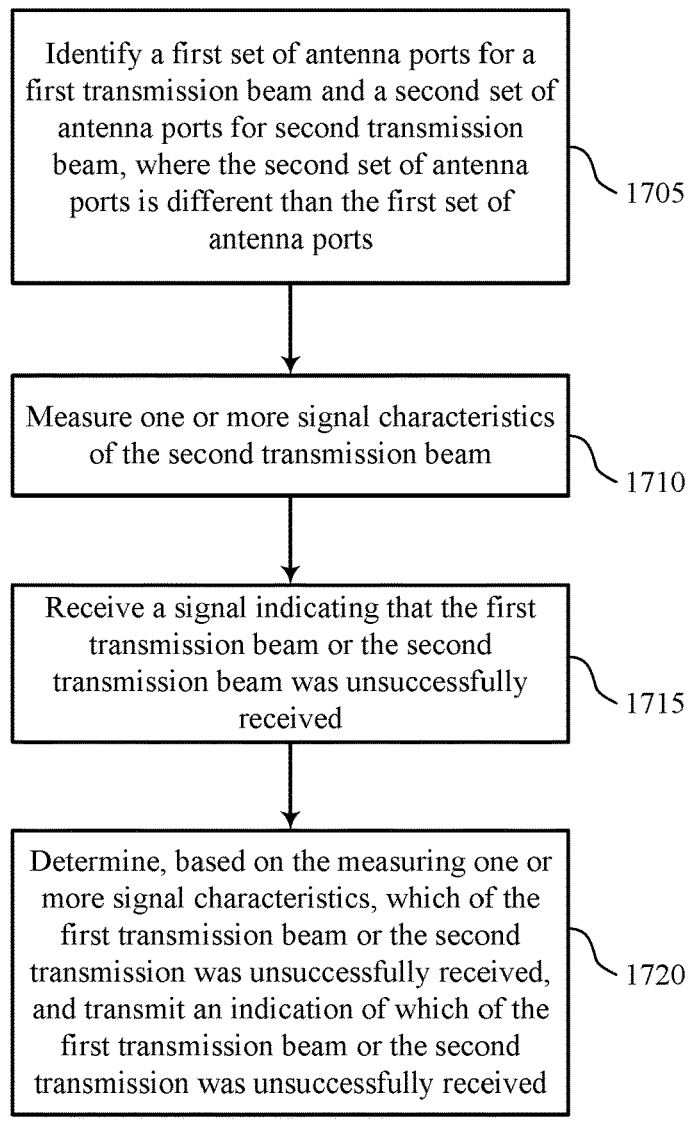

FIG. 17 shows a flowchart illustrating a method 1700 for beam failure identification and recovery techniques in accordance with aspects of the present disclosure. The operations of method 1700 may be implemented by a UE 115 or its components as described herein. For example, the operations of method 1700 may be performed by a UE beam manager as described with reference to FIGS. 8 through 11. In some examples, a UE 115 may execute a set of codes to control the functional elements of the device to perform the functions described below. Additionally or alternatively, the UE 115 may perform aspects of the functions described below using special-purpose hardware.

At block 1705 the UE 115 may identify a first set of antenna ports for a first transmission beam and a second set of antenna ports for a second transmission beam, wherein the second set of antenna ports is different than the first set of antenna ports. The operations of block 1705 may be performed according to the methods described with reference to FIGS. 1 through 7. In certain examples, aspects of the operations of block 1705 may be performed by a beam identification manager as described with reference to FIGS. 8 through 11.

At block 1710 the UE 115 may measure one or more signal characteristics of the second transmission beam. The operations of block 1710 may be performed according to the methods described with reference to FIGS. 1 through 7. In certain examples, aspects of the operations of block 1710 may be performed by a measurement manager as described with reference to FIGS. 8 through 11.

At block 1715 the UE 115 may receive a signal indicating that the first transmission beam or the second transmission beam was unsuccessfully received. The operations of block 1715 may be performed according to the methods described with reference to FIGS. 1 through 7. In certain examples, aspects of the operations of block 1715 may be performed by a beam recovery manager as described with reference to FIGS. 8 through 11.

At block 1720 the UE 115 may determine, based at least in part on the measuring one or more signal characteristics, which of the first transmission beam or the second transmission was unsuccessfully received, and transmit an indication of which of the first transmission beam or the second transmission was unsuccessfully received. The operations of block 1720 may be performed according to the methods described with reference to FIGS. 1 through 7. In certain examples, aspects of the operations of block 1720 may be performed by a measurement manager as described with reference to FIGS. 8 through 11.

Figure 18:
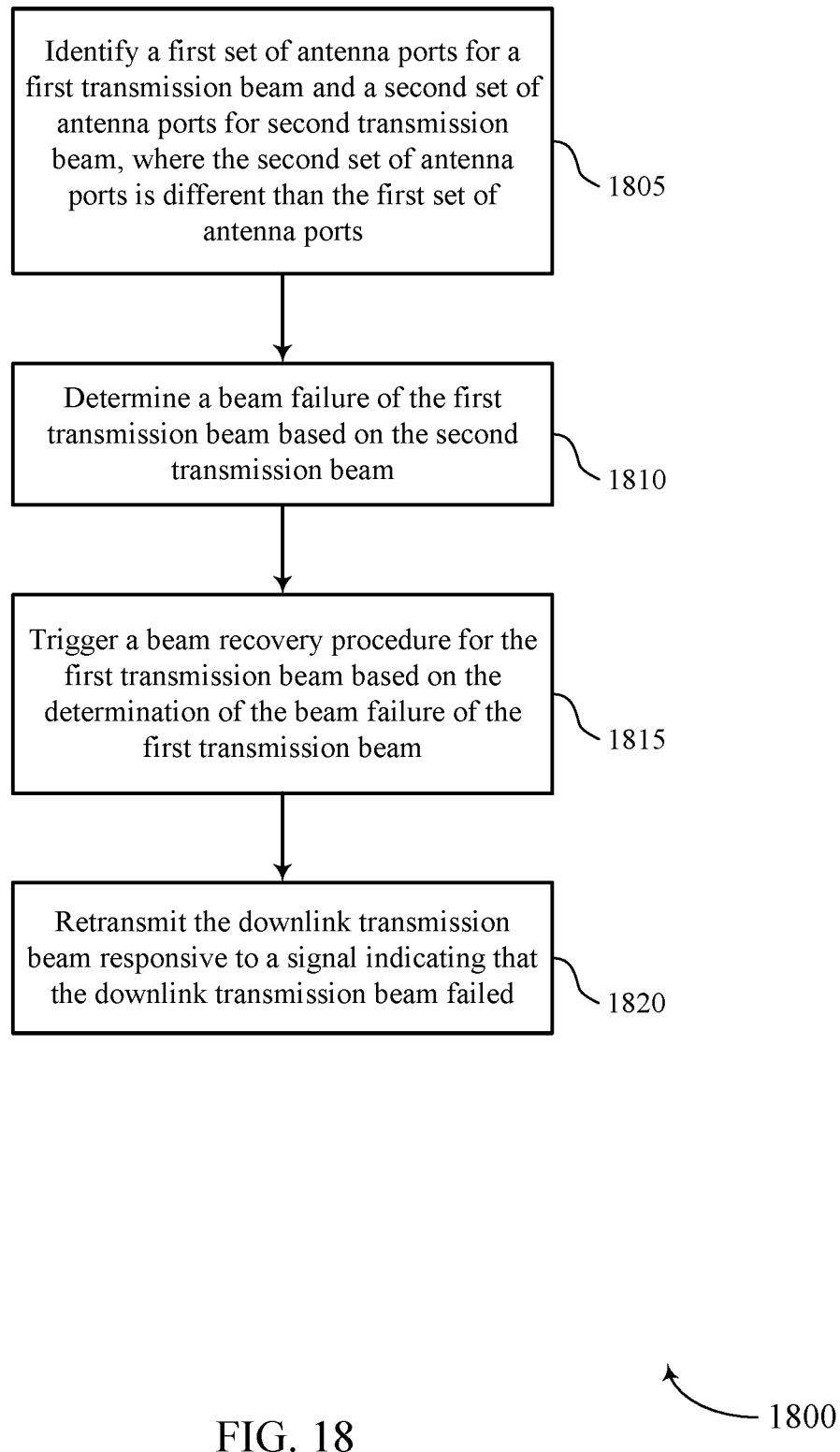

FIG. 18 shows a flowchart illustrating a method 1800 for beam failure identification and recovery techniques in accordance with aspects of the present disclosure. The operations of method 1800 may be implemented by a base station 105 or its components as described herein. For example, the operations of method 1800 may be performed by a base station beam manager as described with reference to FIGS. 12 through 15. In some examples, a base station 105 may execute a set of codes to control the functional elements of the device to perform the functions described below. Additionally or alternatively, the base station 105 may perform aspects of the functions described below using special-purpose hardware.

At block 1805 the base station 105 may identify a first set of antenna ports for a first transmission beam and a second set of antenna ports for a second transmission beam, wherein the second set of antenna ports is different than the first set of antenna ports. The operations of block 1805 may be performed according to the methods described with reference to FIGS. 1 through 7. In certain examples, aspects of the operations of block 1805 may be performed by a beam identification manager as described with reference to FIGS. 12 through 15.

At block 1810 the base station 105 may determine a beam failure of the first transmission beam based at least in part on the second transmission beam. The operations of block 1810 may be performed according to the methods described with reference to FIGS. 1 through 7. In certain examples, aspects of the operations of block 1810 may be performed by a beam failure component as described with reference to FIGS. 12 through 15.

At block 1815 the base station 105 may trigger a beam recovery procedure for the first transmission beam based at least in part on the determination of the beam failure of the first transmission beam. The operations of block 1815 may be performed according to the methods described with reference to FIGS. 1 through 7. In certain examples, aspects of the operations of block 1815 may be performed by a beam recovery manager as described with reference to FIGS. 12 through 15.

At block 1820 the base station 105 may retransmit the downlink transmission beam responsive to a signal indicating that the downlink transmission beam failed. The operations of block 1820 may be performed according to the methods described with reference to FIGS. 1 through 7. In certain examples, aspects of the operations of block 1820 may be performed by a beam recovery manager as described with reference to FIGS. 12 through 15.

Figure 19:
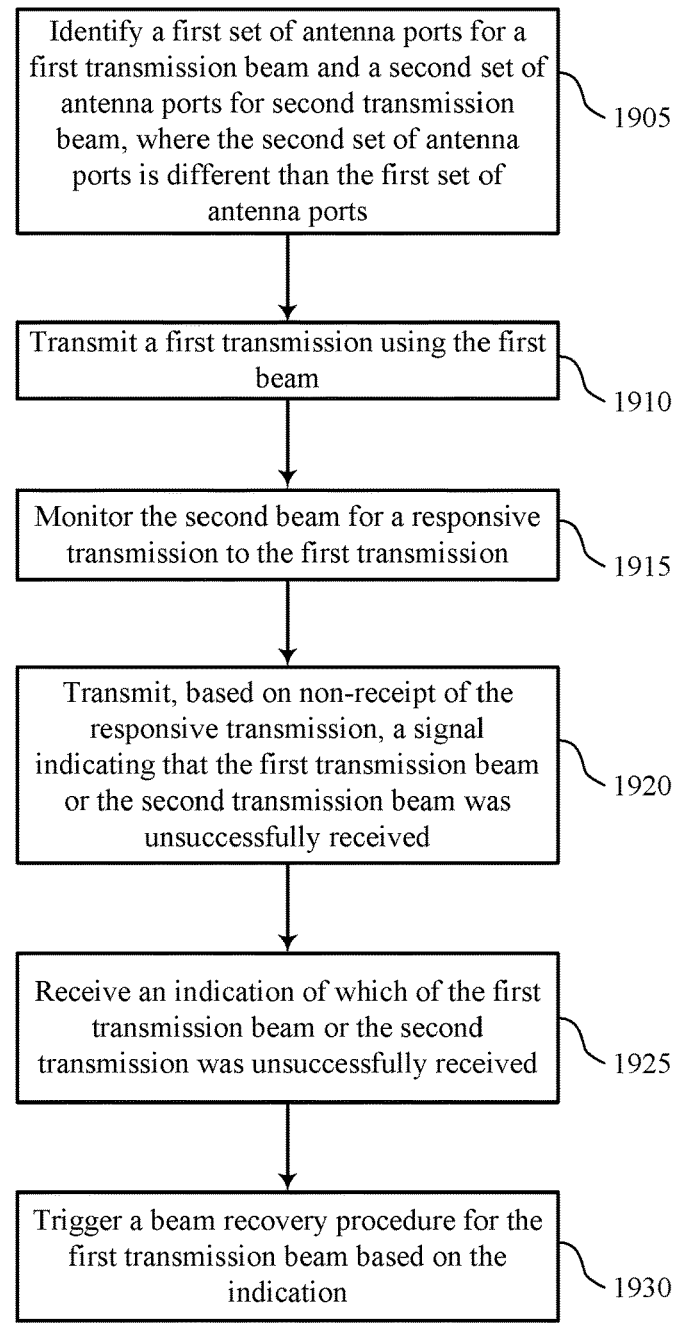

FIG. 19 shows a flowchart illustrating a method 1900 for beam failure identification and recovery techniques in accordance with aspects of the present disclosure. The operations of method 1900 may be implemented by a base station 105 or its components as described herein. For example, the operations of method 1900 may be performed by a base station beam manager as described with reference to FIGS. 12 through 15. In some examples, a base station 105 may execute a set of codes to control the functional elements of the device to perform the functions described below. Additionally or alternatively, the base station 105 may perform aspects of the functions described below using special-purpose hardware.

At block 1905 the base station 105 may identify a first set of antenna ports for a first transmission beam and a second set of antenna ports for a second transmission beam, wherein the second set of antenna ports is different than the first set of antenna ports. The operations of block 1905 may be performed according to the methods described with reference to FIGS. 1 through 7. In certain examples, aspects of the operations of block 1905 may be performed by a beam identification manager as described with reference to FIGS. 12 through 15.

At block 1910 the base station 105 may transmit a first transmission using the first beam. The operations of block 1910 may be performed according to the methods described with reference to FIGS. 1 through 7. In certain examples, aspects of the operations of block 1910 may be performed by a transmitter as described with reference to FIGS. 12 through 15.

At block 1915 the base station 105 may monitor the second beam for a responsive transmission to the first transmission. The operations of block 1915 may be performed according to the methods described with reference to FIGS. 1 through 7. In certain examples, aspects of the operations of block 1915 may be performed by a receiver as described with reference to FIGS. 12 through 15.

At block 1920 the base station 105 may transmit, based at least in part on non-receipt of the responsive transmission, a signal indicating that the first transmission beam or the second transmission beam was unsuccessfully received. The operations of block 1920 may be performed according to the methods described with reference to FIGS. 1 through 7. In certain examples, aspects of the operations of block 1920 may be performed by a beam failure component as described with reference to FIGS. 12 through 15.

At block 1925 the base station 105 may receive an indication of which of the first transmission beam or the second transmission was unsuccessfully received. The operations of block 1925 may be performed according to the methods described with reference to FIGS. 1 through 7. In certain examples, aspects of the operations of block 1925 may be performed by a beam recovery manager as described with reference to FIGS. 12 through 15.

At block 1930 the base station 105 may trigger a beam recovery procedure for the first transmission beam based at least in part on the determination of the beam failure of the first transmission beam. The operations of block 1930 may be performed according to the methods described with reference to FIGS. 1 through 7. In certain examples, aspects of the operations of block 1930 may be performed by a beam recovery manager as described with reference to FIGS. 12 through 15.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
    identifying a first set of antenna ports for a first transmission beam and a second set of antenna ports for a second transmission beam, wherein the second set of antenna ports is different than the first set of antenna ports;
    measuring one or more signal characteristics of the second transmission beam; and
    triggering a beam recovery procedure for the first transmission beam based at least in part on the one or more measured signal characteristics of the second transmission beam,
    wherein the first transmission beam is an uplink transmission beam from a user equipment (UE) to a base station and the second transmission beam is a downlink transmission beam from the base station to the UE.

2. The method of claim 1, wherein the triggering the beam recovery procedure comprises:
    transmitting an indication of a beam failure using a configured transmission resource.

3. The method of claim 2, wherein the indication of the beam failure comprises an indication of one or more of a transmission beam failure or a reception beam failure.

4. The method of claim 2, wherein the configured transmission resource comprises one or more of a scheduling request (SR) resource or a physical uplink control channel (PUCCH) resource that is configured for transmitting the indication of the beam failure.

5. The method of claim 1, wherein the triggering the beam recovery procedure comprises:
    transmitting an indication that one or more of the uplink transmission beam or the downlink transmission beam were unsuccessfully received.

6. The method of claim 5, further comprising:
    receiving a signal indicating which of the uplink transmission beam or the downlink transmission beam was unsuccessfully received.

7. The method of claim 1, further comprising:
receiving a signal indicating that the first transmission beam or the second transmission beam was unsuccessfully received; and
determining, based at least in part on the measuring one or more signal characteristics, which of the first transmission beam or the second transmission beam was unsuccessfully received,
wherein the triggering the recovery procedure comprises transmitting an indication of which of the first transmission beam or the second transmission beam was unsuccessfully received.

8. The method of claim 1, wherein the identifying the first set of antenna ports and the second set of antenna ports comprises:
receiving a configuration to use the first set of antenna ports for the first transmission beam and to use the second set of antenna ports for measuring one or more of a reference signal (RS) or synchronization signal (SS) provided over the second transmission beam.

9. The method of claim 8, wherein the measuring the one or more signal characteristics of the second transmission beam comprises:
measuring one or more of the RS or SS received on the second set of antenna ports to obtain a channel quality value; and
comparing the channel quality value to a threshold value associated with a failure of the first transmission beam.

10. The method of claim 9, wherein the triggering the beam recovery procedure comprises:
transmitting an indication of a first transmission beam failure responsive to the channel quality value being below the threshold value.

11. A method for wireless communication, comprising:
identifying a first set of antenna ports for a first transmission beam and a second set of antenna ports for a second transmission beam, wherein the second set of antenna ports is different than the first set of antenna ports;
measuring one or more signal characteristics of the second transmission beam; and
triggering a beam recovery procedure for the first transmission beam based at least in part on the one or more measured signal characteristics of the second transmission beam,
wherein the identifying the first set of antenna ports and the second set of antenna ports comprises:
configuring the first set of antenna ports for transmission of a downlink transmission beam as the first transmission beam; and
configuring the second set of antenna ports for transmissions of an uplink transmission beam as the second transmission beam, the uplink transmission beam including a reference signal that is derived from the first transmission beam.

12. The method of claim 11, further comprising:
transmitting the first transmission beam using the first set of antenna ports;
receiving the second transmission beam using the second set of antenna ports;
measuring the reference signal included in the second transmission beam; and
determining a beam failure of the first transmission beam based at least in part on the measured reference signal,
wherein the triggering the beam recovery procedure for the first transmission beam is based at least in part on the determining the beam failure.

13. The method of claim 11, further comprising:
receiving the first transmission beam using the first set of antenna ports;
deriving the reference signal from the received first transmission beam; and
transmitting the reference signal in the second transmission beam.

14. The method of claim 11, wherein the triggering the beam recovery procedure comprises:
transmitting an indication of a beam failure using a configured transmission resource.

15. The method of claim 14, wherein the indication of the beam failure comprises an indication of one or more of a transmission beam failure or a reception beam failure.

16. The method of claim 14, wherein the configured transmission resource comprises one or more of a scheduling request (SR) resource or a physical uplink control channel (PUCCH) resource that is configured for transmitting the indication of the beam failure.

17. The method of claim 11, wherein the triggering the beam recovery procedure comprises:
transmitting an indication that one or more of the uplink transmission beam or the downlink transmission beam were unsuccessfully received.

18. The method of claim 17, further comprising:
receiving a signal indicating which of the uplink transmission beam or the downlink transmission beam was unsuccessfully received.

19. A method for wireless communication, comprising:
identifying a first set of antenna ports for a first transmission beam and a second set of antenna ports for a second transmission beam, wherein the second set of antenna ports is different than the first set of antenna ports;
measuring one or more signal characteristics of the second transmission beam; and
triggering a beam recovery procedure for the first transmission beam based at least in part on the one or more measured signal characteristics of the second transmission beam,
wherein the identifying the first set of antenna ports and the second set of antenna ports comprises:
configuring the first set of antenna ports for transmission of a downlink transmission beam; and
configuring the second set of antenna ports for downlink reference signal (RS) or downlink synchronization signal (SS) transmissions, wherein the second set of antenna ports are quasi-co-located (QCL) with the first set of antenna ports.

20. The method of claim 19, further comprising:
receiving the downlink RS or downlink SS transmissions; and
determining a beam failure of the first transmission beam based at least in part on the received downlink RS or SS transmissions,
wherein the triggering the beam recovery procedure for the first transmission beam is based at least in part on the determining the beam failure.

21. An apparatus for wireless communication, in a system comprising:
a processor;
memory in electronic communication with the processor; and
instructions stored in the memory and operable, when executed by the processor, to cause the apparatus to:
identify a first set of antenna ports for a first transmission beam and a second set of antenna ports for second transmission beam, wherein the second set of antenna ports is different than the first set of antenna ports;

measure one or more signal characteristics of the second transmission beam; and trigger a beam recovery procedure for the first transmission beam based at least in part on the one or more measured signal characteristics of the second transmission beam, wherein the first transmission beam is an uplink transmission beam from a user equipment (UE) to a base station and the second transmission beam is a downlink transmission beam from the base station to the UE.

22. The apparatus of claim 21, wherein the instructions cause the apparatus to trigger the beam recovery procedure comprises an instruction to:

transmit an indication of a beam failure using a configured transmission resource.

23. The apparatus of claim 22, wherein the indication of the beam failure comprises an indication of one or more of a transmission beam failure or a reception beam failure.

24. The apparatus of claim 22, wherein the configured transmission resource comprises one or more of a scheduling request (SR) resource or a physical uplink control channel (PUCCH) resource that is configured for transmitting the indication of the beam failure.

25. The apparatus of claim 21, wherein the instructions cause the apparatus to trigger the beam recovery procedure comprises an instruction to:

transmit an indication that one or more of the uplink transmission beam or the downlink transmission beam were unsuccessfully received.

26. The apparatus of claim 21, wherein the instructions further cause the apparatus to:

receive a signal indicating which of the uplink transmission beam or the downlink transmission beam was unsuccessfully received.

27. The apparatus of claim 21, wherein the instructions further cause the apparatus to:

receive a signal indicating that the first transmission beam or the second transmission beam was unsuccessfully received; and determine, based at least in part on the measured one or more signal characteristics, which of the first transmission beam or the second transmission beam was unsuccessfully received, wherein the instructions to cause the apparatus to trigger the recovery procedure comprises an instruction to transmit an indication of which of the first transmission beam or the second transmission beam was unsuccessfully received.

28. The apparatus of claim 21, wherein the instructions to cause the apparatus to identify the first set of antenna ports and the second set of antenna ports comprises an instruction to:

receive a configuration to use the first set of antenna ports for the first transmission beam and to use the second set of antenna ports for measuring one or more of a reference signal (RS) or synchronization signal (SS) provided over the second transmission beam.

29. The apparatus of claim 21, wherein the instructions to cause the apparatus to measure the one or more signal characteristics of the second transmission beam comprises an instruction to:

measure one or more of a reference signal or synchronization signal received on the second set of antenna ports to obtain a channel quality value; and compare the channel quality value to a threshold value associated with a failure of the first transmission beam.

30. The apparatus of claim 29, wherein the instructions to cause the apparatus to trigger the beam recovery procedure comprises an instruction to:

transmit an indication of a first transmission beam failure responsive to the channel quality value being below the threshold value.

* * * * *